US009953296B2

United States Patent
Crimm et al.

(10) Patent No.: US 9,953,296 B2
(45) Date of Patent: Apr. 24, 2018

(54) SYSTEM, METHOD, AND COMPUTER-READABLE MEDIUM FOR MANAGING EDGE DEVICES

(71) Applicant: Hand Held Products, Inc., Fort Mill, SC (US)

(72) Inventors: Paul Crimm, Fort Mill, SC (US); Aldo Caballero, Durham, NC (US); Taylor Smith, Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 468 days.

(21) Appl. No.: 14/791,920

(22) Filed: Jul. 6, 2015

(65) Prior Publication Data
US 2015/0310389 A1     Oct. 29, 2015

Related U.S. Application Data

(63) Continuation of application No. PCT/US2014/011271, filed on Jan. 13, 2014.
(Continued)

(51) Int. Cl.
*G06Q 10/10*     (2012.01)
*H04L 12/24*     (2006.01)
(Continued)

(52) U.S. Cl.
CPC ............ *G06Q 10/10* (2013.01); *G06F 3/0482* (2013.01); *G06F 3/04817* (2013.01);
(Continued)

(58) Field of Classification Search
CPC ... H04L 41/22; H04L 41/12; H04L 12/40117; H04L 41/046
See application file for complete search history.

(56) References Cited

U.S. PATENT DOCUMENTS 6,832,725 B2    12/2004    Gardiner et al.
7,128,266 B2    10/2006    Marlton et al.
(Continued)

FOREIGN PATENT DOCUMENTS

WO     2013163789 A1    11/2013
WO     2013173985 A1    11/2013
(Continued)

OTHER PUBLICATIONS

U.S. Appl. No. 13/367,978, filed Feb. 7, 2012, (Feng et al.); now abandoned.
(Continued)

*Primary Examiner* — Namitha Pillai
(74) *Attorney, Agent, or Firm* — Additon, Higgins & Pendleton, P.A.

(57) ABSTRACT

A system for managing edge devices, such as scanner devices, typically includes a management module having a processor. The processor is typically communicatively coupled to a user interface that includes a visual display and a plurality of edge devices. The processor may also be communicatively coupled to a plurality of intermediate devices. The management module enables a user of the user interface to manage various aspects of the system. The processor is typically configured for displaying with the visual display (i) a physical view of the connections between the management module, the intermediate devices, and the edge devices and (ii) a first user-defined view of the management module, the intermediate devices, and the scanner devices. The processor is typically also configured for managing operational information generated by connected edge devices, including for efficiently storing operational information and intelligently querying the operational information to assist the user in matching compatible plug-in applications with particular edge devices.

20 Claims, 15 Drawing Sheets

Related U.S. Application Data

(60) Provisional application No. 61/751,411, filed on Jan. 11, 2013.

(51) Int. Cl.

| | | |
|---|---|---|
| *H04N 1/00* | (2006.01) | |
| *G06F 3/0481* | (2013.01) | |
| *G06F 3/0482* | (2013.01) | |

(52) U.S. Cl.
CPC ............. *H04L 41/12* (2013.01); *H04L 41/22* (2013.01); *H04N 1/00344* (2013.01); *H04L 41/0803* (2013.01); *H04L 41/0883* (2013.01); *H04N 2201/0081* (2013.01)

(56) References Cited

U.S. PATENT DOCUMENTS

| | | | |
|---|---|---|---|
| 7,159,783 | B2 | 1/2007 | Walczyk et al. |
| 7,413,127 | B2 | 8/2008 | Ehrhart et al. |
| 7,726,575 | B2 | 6/2010 | Wang et al. |
| 8,271,452 | B2 | 9/2012 | Longshaw |
| 8,294,969 | B2 | 10/2012 | Plesko |
| 8,317,105 | B2 | 11/2012 | Kotlarsky et al. |
| 8,322,622 | B2 | 12/2012 | Suzhou et al. |
| 8,366,005 | B2 | 2/2013 | Kotlarsky et al. |
| 8,371,507 | B2 | 2/2013 | Haggerty et al. |
| 8,376,233 | B2 | 2/2013 | Horn et al. |
| 8,381,979 | B2 | 2/2013 | Franz |
| 8,390,909 | B2 | 3/2013 | Plesko |
| 8,408,464 | B2 | 4/2013 | Zhu et al. |
| 8,408,468 | B2 | 4/2013 | Horn et al. |
| 8,408,469 | B2 | 4/2013 | Good |
| 8,424,768 | B2 | 4/2013 | Rueblinger et al. |
| 8,448,863 | B2 | 5/2013 | Xian et al. |
| 8,457,013 | B2 | 6/2013 | Essinger et al. |
| 8,459,557 | B2 | 6/2013 | Havens et al. |
| 8,469,272 | B2 | 6/2013 | Kearney |
| 8,474,712 | B2 | 7/2013 | Kearney et al. |
| 8,479,992 | B2 | 7/2013 | Kotlarsky et al. |
| 8,490,877 | B2 | 7/2013 | Kearney |
| 8,517,271 | B2 | 8/2013 | Kotlarsky et al. |
| 8,523,076 | B2 | 9/2013 | Good |
| 8,528,818 | B2 | 9/2013 | Ehrhart et al. |
| 8,544,737 | B2 | 10/2013 | Gomez et al. |
| 8,548,420 | B2 | 10/2013 | Grunow et al. |
| 8,550,335 | B2 | 10/2013 | Samek et al. |
| 8,550,354 | B2 | 10/2013 | Gannon et al. |
| 8,550,357 | B2 | 10/2013 | Kearney |
| 8,556,174 | B2 | 10/2013 | Kosecki et al. |
| 8,556,176 | B2 | 10/2013 | Van Horn et al. |
| 8,556,177 | B2 | 10/2013 | Hussey et al. |
| 8,559,767 | B2 | 10/2013 | Barber et al. |
| 8,561,895 | B2 | 10/2013 | Gomez et al. |
| 8,561,903 | B2 | 10/2013 | Sauerwein |
| 8,561,905 | B2 | 10/2013 | Edmonds et al. |
| 8,565,107 | B2 | 10/2013 | Pease et al. |
| 8,571,307 | B2 | 10/2013 | Li et al. |
| 8,579,200 | B2 | 11/2013 | Samek et al. |
| 8,583,924 | B2 | 11/2013 | Caballero et al. |
| 8,584,945 | B2 | 11/2013 | Wang et al. |
| 8,587,595 | B2 | 11/2013 | Wang |
| 8,587,697 | B2 | 11/2013 | Hussey et al. |
| 8,588,869 | B2 | 11/2013 | Sauerwein et al. |
| 8,590,789 | B2 | 11/2013 | Nahill et al. |
| 8,596,539 | B2 | 12/2013 | Havens et al. |
| 8,596,542 | B2 | 12/2013 | Havens et al. |
| 8,596,543 | B2 | 12/2013 | Havens et al. |
| 8,599,271 | B2 | 12/2013 | Havens et al. |
| 8,599,957 | B2 | 12/2013 | Peake et al. |
| 8,600,158 | B2 | 12/2013 | Li et al. |
| 8,600,167 | B2 | 12/2013 | Showering |
| 8,602,309 | B2 | 12/2013 | Longacre et al. |
| 8,608,053 | B2 | 12/2013 | Meier et al. |
| 8,608,071 | B2 | 12/2013 | Liu et al. |
| 8,611,309 | B2 | 12/2013 | Wang et al. |
| 8,615,487 | B2 | 12/2013 | Gomez et al. |
| 8,621,123 | B2 | 12/2013 | Caballero |
| 8,622,303 | B2 | 1/2014 | Meier et al. |
| 8,628,013 | B2 | 1/2014 | Ding |
| 8,628,015 | B2 | 1/2014 | Wang et al. |
| 8,628,016 | B2 | 1/2014 | Winegar |
| 8,629,926 | B2 | 1/2014 | Wang |
| 8,630,491 | B2 | 1/2014 | Longacre et al. |
| 8,635,309 | B2 | 1/2014 | Berthiaume et al. |
| 8,636,200 | B2 | 1/2014 | Kearney |
| 8,636,212 | B2 | 1/2014 | Nahill et al. |
| 8,636,215 | B2 | 1/2014 | Ding et al. |
| 8,636,224 | B2 | 1/2014 | Wang |
| 8,638,806 | B2 | 1/2014 | Wang et al. |
| 8,640,958 | B2 | 2/2014 | Lu et al. |
| 8,640,960 | B2 | 2/2014 | Wang et al. |
| 8,643,717 | B2 | 2/2014 | Li et al. |
| 8,646,692 | B2 | 2/2014 | Meier et al. |
| 8,646,694 | B2 | 2/2014 | Wang et al. |
| 8,657,200 | B2 | 2/2014 | Ren et al. |
| 8,659,397 | B2 | 2/2014 | Vargo et al. |
| 8,668,149 | B2 | 3/2014 | Good |
| 8,678,285 | B2 | 3/2014 | Kearney |
| 8,678,286 | B2 | 3/2014 | Smith et al. |
| 8,682,077 | B1 | 3/2014 | Longacre |
| D702,237 | S | 4/2014 | Oberpriller et al. |
| 8,687,282 | B2 | 4/2014 | Feng et al. |
| 8,692,927 | B2 | 4/2014 | Pease et al. |
| 8,695,880 | B2 | 4/2014 | Bremer et al. |
| 8,698,949 | B2 | 4/2014 | Grunow et al. |
| 8,702,000 | B2 | 4/2014 | Barber et al. |
| 8,717,494 | B2 | 5/2014 | Gannon |
| 8,720,783 | B2 | 5/2014 | Biss et al. |
| 8,723,804 | B2 | 5/2014 | Fletcher et al. |
| 8,723,904 | B2 | 5/2014 | Marty et al. |
| 8,727,223 | B2 | 5/2014 | Wang |
| 8,740,082 | B2 | 6/2014 | Wilz |
| 8,740,085 | B2 | 6/2014 | Furlong et al. |
| 8,746,563 | B2 | 6/2014 | Hennick et al. |
| 8,750,445 | B2 | 6/2014 | Peake et al. |
| 8,752,766 | B2 | 6/2014 | Xian et al. |
| 8,756,059 | B2 | 6/2014 | Braho et al. |
| 8,757,495 | B2 | 6/2014 | Qu et al. |
| 8,760,563 | B2 | 6/2014 | Koziol et al. |
| 8,736,909 | B2 | 7/2014 | Reed et al. |
| 8,777,108 | B2 | 7/2014 | Coyle |
| 8,777,109 | B2 | 7/2014 | Oberpriller et al. |
| 8,779,898 | B2 | 7/2014 | Havens et al. |
| 8,781,520 | B2 | 7/2014 | Payne et al. |
| 8,783,573 | B2 | 7/2014 | Havens et al. |
| 8,789,757 | B2 | 7/2014 | Barten |
| 8,789,758 | B2 | 7/2014 | Hawley et al. |
| 8,789,759 | B2 | 7/2014 | Xian et al. |
| 8,794,520 | B2 | 8/2014 | Wang et al. |
| 8,794,522 | B2 | 8/2014 | Ehrhart |
| 8,794,525 | B2 | 8/2014 | Amundsen et al. |
| 8,794,526 | B2 | 8/2014 | Wang et al. |
| 8,798,367 | B2 | 8/2014 | Ellis |
| 8,807,431 | B2 | 8/2014 | Wang et al. |
| 8,807,432 | B2 | 8/2014 | Van Horn et al. |
| 8,820,630 | B2 | 9/2014 | Qu et al. |
| 8,822,848 | B2 | 9/2014 | Meagher |
| 8,824,692 | B2 | 9/2014 | Sheerin et al. |
| 8,824,696 | B2 | 9/2014 | Braho |
| 8,842,849 | B2 | 9/2014 | Wahl et al. |
| 8,844,822 | B2 | 9/2014 | Kotlarsky et al. |
| 8,844,823 | B2 | 9/2014 | Fritz et al. |
| 8,849,019 | B2 | 9/2014 | Li et al. |
| D716,285 | S | 10/2014 | Chaney et al. |
| 8,851,383 | B2 | 10/2014 | Yeakley et al. |
| 8,854,633 | B2 | 10/2014 | Laffargue |
| 8,866,963 | B2 | 10/2014 | Grunow et al. |
| 8,868,421 | B2 | 10/2014 | Braho et al. |
| 8,868,519 | B2 | 10/2014 | Maloy et al. |
| 8,868,802 | B2 | 10/2014 | Barten |
| 8,868,803 | B2 | 10/2014 | Bremer et al. |
| 8,870,074 | B1 | 10/2014 | Gannon |
| 8,879,639 | B2 | 11/2014 | Sauerwein |

(56) References Cited

U.S. PATENT DOCUMENTS

| | | |
|---|---|---|
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2003/0061323 A1 | 3/2003 | East et al. |
| 2004/0088678 A1 | 5/2004 | Litoiu et al. |
| 2007/0063048 A1 | 3/2007 | Havens et al. |
| 2008/0307314 A1 | 12/2008 | Cisler et al. |
| 2009/0134221 A1 | 5/2009 | Zhu et al. |
| 2010/0064225 A1 | 3/2010 | Cunningham et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0145812 A1 | 6/2011 | Kong et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |

(56) References Cited

U.S. PATENT DOCUMENTS

| | | |
|---|---|---|
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2014019130 A1 | 2/2014 |
| WO | 2014/110495 A2 | 7/2014 |
| WO | 2014110495 A1 | 7/2014 |

OTHER PUBLICATIONS

U.S. Appl. No. 14/462,801 for Mobile Computing Device With Data Cognition Software, filed Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/662,922 for Multifunction Point of Sale System filed Mar. 19, 2015 (Van Horn et al.); 41 pages.

U.S. Appl. No. 14/446,391 for Multifunction Point of Sale Apparatus With Optical Signature Capture filed Jul. 30, 2014 (Good et al.); 37 pages.

U.S. Appl. No. 29/528,165 for In-Counter Barcode Scanner filed May 27, 2015 (Oberpriller et al.); 13 pages.

U.S. Appl. No. 29/528,890 for Mobile Computer Housing filed Jun. 2, 2015 (Fitch et al.); 61 pages.

U.S. Appl. No. 14/614,796 for Cargo Apportionment Techniques filed Feb. 5, 2015 (Morton et al.); 56 pages.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 14/578,627 for Safety System and Method filed Dec. 22, 2014 (Ackley et al.); 32 pages.

U.S. Appl. No. 14/573,022 for Dynamic Diagnostic Indicator Generation filed Dec. 17, 2014 (Goldsmith); 43 pages.

(56) References Cited

OTHER PUBLICATIONS

U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
European extended search report in related EP Application No. 1737762.6, dated Jul. 5, 2016, 11 pages.
Johnson KD et al.; "Extending OS/2 Presentation Manager Drag and Drop Capabilities," IP.com Journal, IP.com Inc., (West Henrietta, NY; Dated May 31, 1994, 3 pages.
International Search Report in counterpart International Application No. PCT/US14/11271 dated Jul. 11, 2014, pp. 1-3.
International Preliminary Report on Patentability in counterpart International Application No. PCT/US14/11271 dated Jul. 14, 2015, pp. 1-14.
Crimm et al., counterpart U.S. Appl. No. 61/751,411 for "System for Managing Scanner Devices" filed Jan. 11, 2013, pp. 1-43.
Daniel, "Israel's Pebbles joins wireless gesture-tech rush", MW Market Watch, published at http://www.marketwatch.com/story/israels-pebbles-joins-wireless-gesture-tech-rush-2011-12-14?pagenumber=1 on Dec. 14, 2011, pp. 1-3.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader, filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augmented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.

(56) References Cited

OTHER PUBLICATIONS

U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a volume Dimensioner filed Jun. 16, 2015 (Ackley et al.); 63 pages.

SYSTEM, METHOD, AND COMPUTER-READABLE MEDIUM FOR MANAGING EDGE DEVICES

CROSS-REFERENCE TO RELATED APPLICATIONS

The present application claims the benefit of International Application No. PCT/US2014/011271 for a System, Method, and Computer-Readable Medium for Managing Edge Devices filed Jan. 13, 2014 (and published Jul. 17, 2014 as WIPO Publication No. WO 2014/110495), which claims the benefit of U.S. Patent Application No. 61/751,411 for a System for Managing Scanner Devices filed Jan. 11, 2013. Each of the foregoing patent applications and patent publication is hereby incorporated by reference in its entirety.

FIELD OF THE INVENTION

The present invention relates to the field of device management, more specifically, to an improved system for managing scanner devices.

BACKGROUND

It is common for organizations (e.g., businesses) to employ thousands of scanners (e.g., barcode scanners). These scanners are typically "dumb" (i.e., have very limited internal processing capabilities), and thus must be connected to a device having greater computing power, such as a cash register or a personal computer, in order to perform many tasks. Managing such a large number of devices can be quite difficult. For example, employing a large number of scanners can make it difficult to retrieve and visually display information about the scanners.

In addition, during the lifetime of a scanner it is typically necessary to update or change the configuration of the scanner. Altering a scanner's configuration typically requires connecting the scanner to a computer and thereafter using the computer to alter the configuration of the scanner. Accordingly, altering the configuration of many scanners can be quite time consuming.

Furthermore, managing the extremely large volume of data collectively generated by large numbers of connected scanner devices or other edge devices can be challenging. Traditional architectures may not provide suitable functionality and scalability for a device communications ecosystem that includes extremely large numbers of these edge devices, due in large part to the disparate data systems employed across these various edge device domains.

Accordingly, a need exists for an improved way of retrieving and displaying scanner information and other edge device information. Furthermore, a need exists for an improved way of altering scanner configurations, and an improved way of exchanging, preserving, and searching edge device data.

SUMMARY

Accordingly, in one aspect, the present invention embraces a system (e.g., system) for managing scanner devices. The system typically includes a management module having a processor. The processor is typically communicatively coupled to (i) a user interface that includes a visual display, (ii) a plurality of intermediate devices, and (iii) a plurality of scanner devices. Typically, at least one of the scanner devices is communicatively coupled to one of the intermediate devices.

The processor is typically configured for displaying with the visual display (i) a physical view of the connections between the management module, the intermediate devices, and the scanner devices and (ii) a first user-defined view of the management module, the intermediate devices, and the scanner devices. The physical view typically includes (i) a plurality of icons, each icon representing one of the management module, intermediate devices, or scanner devices, and (ii) a plurality of markers, the markers representing the connections between the management module, the intermediate devices, and the scanner devices. In addition, the physical view typically has a hub and spoke architecture. The first user-defined view typically includes a plurality of icons, each icon representing one of the management module, intermediate devices, or scanner devices. For each icon representing a surrogate device the first user-defined view includes an icon for each intermediate device or scanner device dependent on the surrogate device and one or more markers representing the connections therebetween.

The processor is typically configured further for (i) creating a folder in the first user-defined view in response to a command received from the user interface and (ii) moving a folder in the first user-defined view in response to a command received from the user interface.

Moreover, the processor is typically configured for receiving a command from the user interface to move an icon representing one of the intermediate devices or scanner devices within the first user-defined view, and, thereafter, (i) maintaining the position of the icon if the intermediate device or scanner device represented by the icon is dependent on a surrogate device or (ii) moving the icon in accordance with the command from the user interface if the intermediate device or scanner device represented by the icon is not dependent on a surrogate device. If the icon represents a surrogate device, moving the icon typically includes moving an icon for each intermediate device or scanner device dependent on the surrogate device and one or more markers representing the connections therebetween.

In another aspect, the present invention embraces a system that includes a scanner device for acquiring indicia information, a customer-data-capturing module for acquiring customer data, and a management module. The management module includes a processor and memory, and is in communication with the scanner device and customer-data-capturing module. The management module is configured for receiving indicia information from the scanner device and for receiving customer data from the customer-data-capturing module. The management device is also configured for correlating the indicia information with the customer data.

In an exemplary embodiment, the customer-data-capturing module includes a customer-facing imager configured for recognizing a plurality of human gestures, and the customer data comprises customer-gesture data.

In yet another exemplary embodiment, the customer-data-capturing module includes a customer interface configured for allowing a customer to input information relating to the customer's level of satisfaction. The customer interface may include a button pad having a first button for indicating that a customer is satisfied and a second button for indicating that a customer is unsatisfied.

In another aspect, the present invention embraces a system for managing edge devices that includes a management module having a processor and memory, the management module being communicatively coupled to (i) to a user interface that includes a visual display, and (ii) an edge device; and a data conversion module. The data conversion module is configured for (i) receiving a message from the edge device, and (ii) converting the message into a common messaging container.

In an exemplary embodiment, converting the message into a common messaging container comprises translating the edge device's operational information in its native vocabulary into the data conversion module's vocabulary.

In another exemplary embodiment, converting the message into a common messaging container comprises maintaining the edge device's operational information in the edge device's native vocabulary.

In another aspect, the present invention embraces a system for managing edge devices that includes a management module having a processor and memory. The system also includes a broker module configured for (i) receiving a message containing an edge device's operational information, (ii) processing the message, and (iii) filtering the message.

In an alternative exemplary embodiment, processing the message comprises routing the message to a destination based upon the content of the message and/or transforming the message by changing the contents of the message. Filtering the message comprises preventing the message from reaching a destination based upon the content of the message or allowing a message to reach a destination based upon the content of the message.

In yet another alternative embodiment, routing the message includes transmitting the message to a messaging client if the message meets the predefined parameters published by the messaging client to the broker module.

In another aspect, the present invention embraces a system for managing edge devices that includes a management module having a processor and memory that includes a databank. The management module is communicatively coupled to (i) a user interface that includes a visual display, and (ii) an edge device. The databank contains operational information generated by the edge device. The memory includes programming to control the processor for (i) receiving from the user interface a user query of the databank; (ii) retrieving from the databank the query results containing the operational information that is responsive to the user query; and (iii) displaying the operational information on the visual display.

In an alternative embodiment, the management module also includes a vendor module for storing comprehension information associated with each of a plurality of plug-in applications. The comprehension information includes an identification of the particular edge device operational information vocabularies that each plug-in application understands.

In yet another alternative embodiment, the memory includes programming to control the processor for (i) comparing the vocabulary of the operational information contained in the query results to the comprehension information stored in the vendor module; (ii) determining the plug-in applications that are capable of understanding at least a portion of the vocabulary of the operational information in the query results, and (iii) displaying on the visual display a listing of the plug-in applications that are capable of understanding at least a portion of the vocabulary of the operational information in the query results.

In yet another alternative embodiment, the listing of plug-in applications includes a ranking of the plug-in applications based on the degree to which each plug-in application understands the operational information in the query results.

In yet another alternative embodiment, the listing of plug-in applications includes a visual representation of the portions of the vocabulary of the operational information in the query results that each plug-in application understands.

In another aspect, the present invention embraces a system for managing edge devices. The system includes a management module having a processor and memory that includes a databank. The management module is communicatively coupled to (i) a user interface that includes a visual display, and (ii) a plurality of edge devices. The system also includes a vocabularies database for storing a plurality of vocabularies that can be used to describe the operational information of the plurality of edge devices.

In another aspect, the present invention embraces a system for managing edge devices that includes a management module having a processor, a memory that includes a databank, and a plurality of broker modules. The management module is communicatively coupled to (i) a user interface that includes a visual display, and (ii) a plurality of edge devices. The management module is configured to store a topology of the connections between the system's broker modules and connected edge devices.

In an alternative embodiment, the management module is configured for displaying in real time on the visual display the connections between broker modules and edge devices.

In another aspect, the present invention embraces a system for managing edge devices that includes a management module having a processor and a memory. The management module is communicatively coupled to (i) a user interface that includes a visual display, (iii) a communications network and (iii) a plurality of edge devices. The system also includes a communications adapter for connecting a dumb device to the communications network such that the management module may acquire operational information from the edge device.

In another aspect, the present invention embraces a method for storing operational information obtained from an edge device and stored in a first XML document into a databank that includes a second XML document. The method includes determining if the data structure of the first XML document matches any subtree of the second XML document. If the data structure of the first XML document does match any subtree of the second XML document, a leaf-element-association between the first XML document and the leaf elements of the second XML document's matching subtree is stored in the databank. If the data structure of the first XML document does not match any subtree of the second XML document, only those elements of the first XML document that are missing from the otherwise matching subtree of the second XML document are added to an otherwise-matching subtree of the second XML document. A leaf-element-association between the first XML document and the leaf elements of the matching, amended subtree is then stored in the databank.

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect, the present invention embraces a system for managing scanner devices. Although the present system is described herein with respect to scanner devices, the system can be used to manage other types of edge devices. An edge device is any type of equipment, instrument, or machine that has the capability to generate data (e.g., machine-readable data) using a processor and to communicate that data via a communications network (e.g. local area network (LAN), wide area network (WAN), Internet, etc.).

Figure 1:
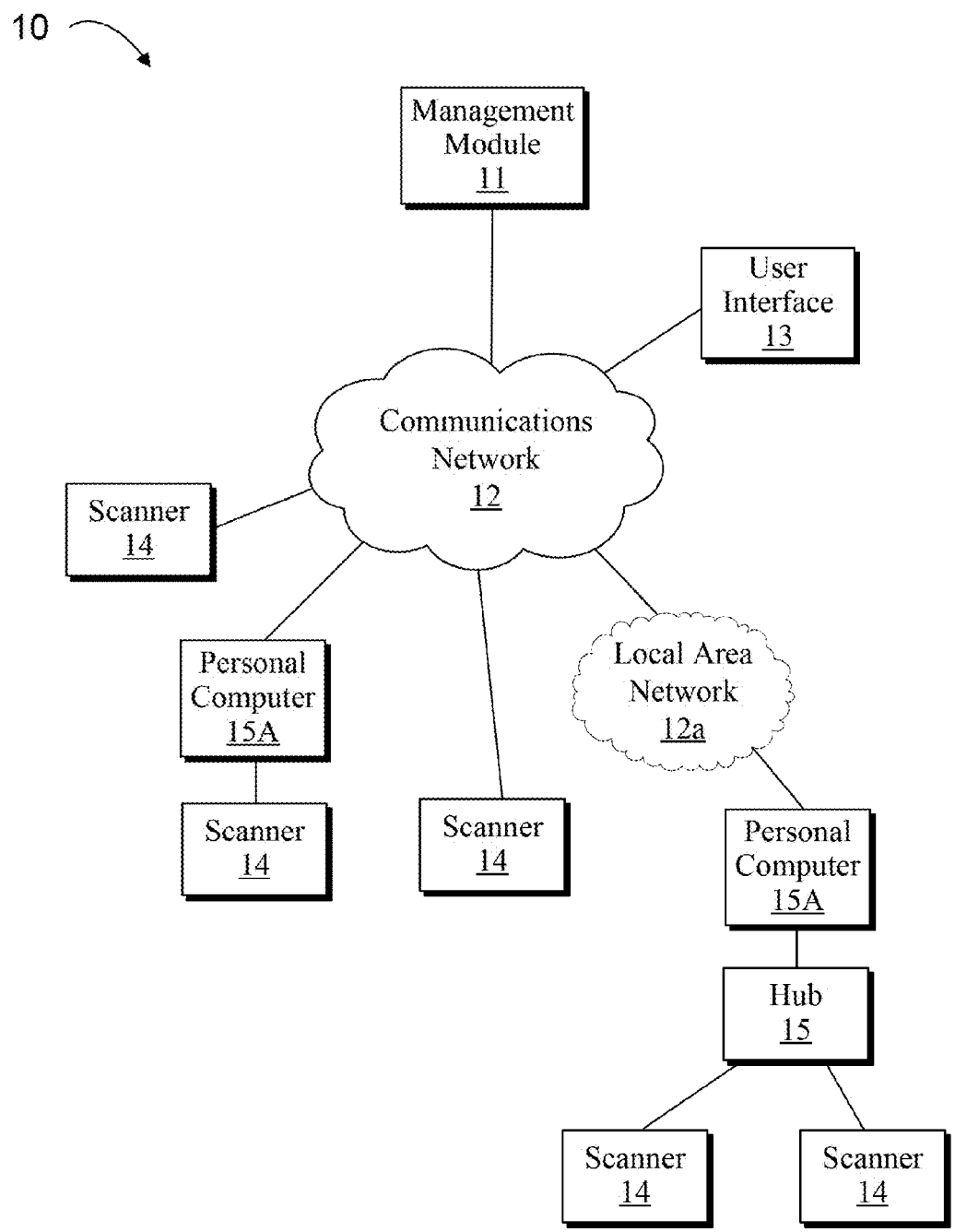
FIG. 1 depicts a block diagram of a system for managing edge devices in accordance with the present invention.

In this regard, FIG. 1 depicts an exemplary system 10 for managing scanner devices. As depicted in FIG. 1, the system 10 for managing scanner devices typically includes a management module 11 that is connected (e.g., via a communications network 12, such as the Internet) to a plurality of scanner devices 14 (e.g., barcode scanners, scanners, barcode readers, indicia readers, indicia reading devices, etc.) and to a plurality of intermediate devices 15.

One or more of the scanner devices 14 may be "dumb" scanners, which require a connection to an intermediate device having greater processing power to perform many tasks. In this regard, a "dumb" scanner device depends upon (e.g., needs to be connected to) a surrogate device 15A (e.g., surrogate intermediate device) in order to be in communication with the management module 11. Similarly, any dumb edge device 14A requires a surrogate device 15A to enable connection with the management module 11.

One or more of the scanner devices 14 may be "smart" scanners that have significant processing power. For example, a scanner device may be a mobile device (e.g., a cellular phone, a smartphone, a personal digital assistant, a portable or mobile computer, and/or a tablet device) having scanning capabilities (e.g., barcode reading abilities). A smart scanner device 14 generally is capable of communicating with the management module 11 without needing to be connected to a surrogate device 15A.

The system 10 for managing scanner devices typically includes a plurality of intermediate devices 15 through which one or more of the scanner devices 14 may be connected to the management module 11. An exemplary intermediate device 15 may be a personal computer, a mobile device, or a scanner hub. One or more of the intermediate devices 15 may act as a surrogate device 15A.

As used herein, a surrogate device 15A is a device through which another device (e.g., a scanner device or another intermediate device) needs to be connected in order to be in communication with the management module 11. For example, a dumb scanner device typically must be connected to a surrogate device 15A (e.g., a personal computer) in order to communicate with the management module 11. In contrast, a smart scanner device typically does not need to be connected to a surrogate device 15A to communicate with the management module 11 (e.g., over a network). That said, a smart scanner device can act as a surrogate device 15A to a dumb scanner device connected thereto.

The management module 11 typically includes a processor that is communicatively coupled to a memory. The management module may include a system bus as well. One or more interface circuits may couple the processor and other components to the system bus. In this regard, the processor may be communicatively coupled to other components via the system bus and/or the interface circuits. Similarly, the other components (e.g., the memory) may each be communicatively coupled to other components via the system bus and/or the interface circuits. Other embodiments of system bus architecture providing for efficient data transfer and/or communication between the components of the management module 11 may be also be employed in exemplary embodiments in accordance with the present invention.

Figure 2:
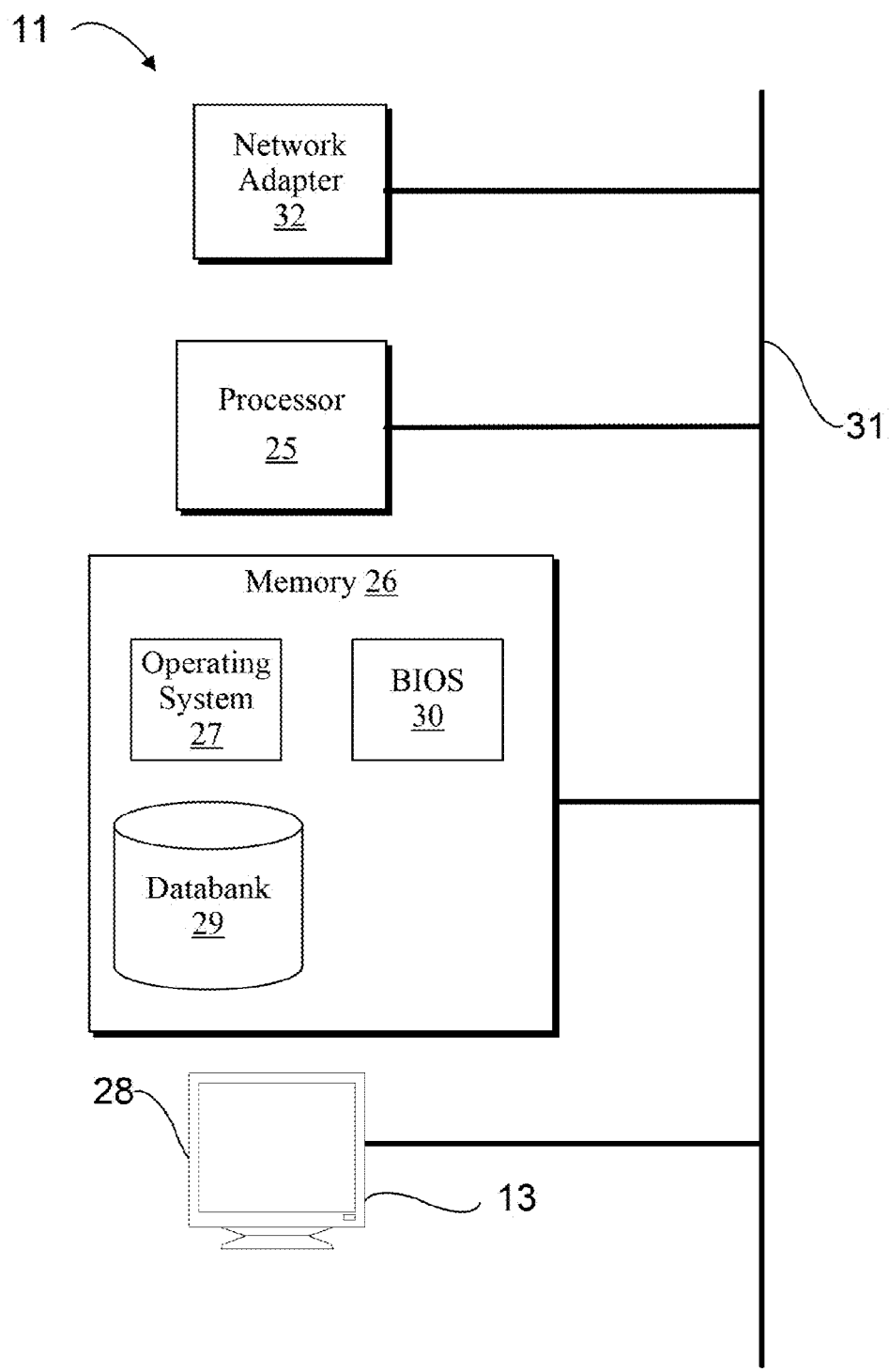
FIG. 2 depicts a block diagram of an exemplary management module of the system according to the present invention.

FIG. 2 is a block diagram illustrating an exemplary embodiment of a management module 11 of the system 10 according to the present invention. Typically, the processor 25 (e.g., computer processor, microprocessor, processing unit) is configured to execute instructions and to carry out operations associated with the management module 11. For example, using instructions retrieved from the memory 26 (e.g., a memory block, memory store), the processor 25 may control the reception and manipulation of input and output data between components of the management module 11. The management module 11 may include multiple processors 25 for increased processing power.

The processor 25 typically operates with an operating system 27 to execute computer code and produce and use data to support the functioning of the system 10. The operating system 27 generally is computer code (e.g., software) that manages the management module's hardware resources and provides common services for computer applications being executed by the processor 25. The operating system 27 may be a distributed operating system managing a group of physically independent computers in such a way as to allow them to perform cooperatively and collectively as a single computer. A distributed operating system can provide for greater computing power and data storage. The operating system 27, other computer code (e.g., program modules, applications), and data may reside within the memory 26 that is operatively coupled to the processor 25. It will be appreciated by a person of ordinary skill in the art that the functions performed by the processor 25 in response to computer code may be alternatively implemented in hardware (e.g., computer hardware) or a combination of hardware and software. For example, one or more programmable logic devices (PLDs) and/or application-specific integrated circuits (ASIC) could be used to carry out the functions of any of the system's program modules.

The memory 26 generally provides a place to store computer code and data that are used by the management module 11. The memory 26 may include Read-Only Memory (ROM), Random-Access Memory (RAM), a hard disk drive, and/or other non-transitory storage media. A basic input/output system (BIOS) 30 containing the basic routines that help to transfer information between components of the management module 11, such as during start-up, is stored in ROM. The management module's RAM typically contains data and/or program modules that are immediately accessible to and/or presently operated on by the processor 28.

In some embodiments, the memory 26 may house a databank 29, which is a database for storing data in an organized manner for later searching (e.g., querying) and retrieval. Typically, the databank 29 is housed (e.g., stored) on at least one hard disk drive component of memory 26. One of ordinary skill in the art will appreciate that other computer storage media may be utilized for housing the databank 29 without departing from the scope of the invention. For example, the databank 29 may be stored on any combination of hard disk drives, memory chips, solid state drives, optical drives, and the like. One of ordinary skill in the art will also recognize that, due to the potentially large amounts of data that the management module 11 may be called upon to store, search and retrieve, the databank 29 will typically be housed on multiple, distributed storage devices. Because the memory module 11 requires fast and efficient storage, searching and retrieval of data, the databank 29 typically is housed on one or more dedicated computers (e.g., database servers) that are substantially devoted to housing all or part of the databank 29. Although the databank 29 may be housed on separate, dedicated computers, for the purposes of the present disclosure the collection of computers (e.g., servers) are all considered part of the memory component of the management module 11.

The data may be structured in the databank 29 in any suitable manner, including the following data structure forms: relational database, object-oriented database, hierarchical database, lightweight director access protocol (LDAP) director, object-oriented-relational database, etc. The databank 29 may conform to any database standard, or may conform to a non-standard, private specification. The databank 29 may be implemented using, for example, any number of commercially-available database products, including SQL Server and Access from Microsoft Corporation, Oracle® from Oracle Corporation, Sybase® from Sybase, Incorporated, etc.

The operating system 27, other computer code, and data may also reside on a removable non-transitory storage medium that is loaded or installed onto management module 11 when needed. Exemplary removable non-transitory storage media include CD ROM, PC-CARD, memory card (e.g., flash memory card), floppy disk, and/or magnetic tape.

The processor 25 is typically communicatively coupled to a user interface 13. The management module 11 may communicate with the user interface 13 (e.g., a user interface residing in a mobile device or other client device) over the communications network 12. Alternatively, the user interface 13 may reside in the same device as the management module 11, such as where the management module is a server computer and the user interface is the server's display screen, keyboard, etc.).

The user interface 13 includes a visual display 28 (e.g., display screen). The visual display may be a touch screen, which is capable of displaying visual information and receiving tactile commands from a user. In addition to the visual display 28, the user interface 13 may also include one or more speakers, buttons, keyboards, mice, and/or microphones.

The management module's network adapter 32 facilitates communications (e.g., the exchange of messages) between the management module 11 and other nodes of the communications network 12, including communications between the management module 11 and the scanner devices 14 (or other edge devices) connected to the communications network 12. Messages, in the context of this disclosure, include any intra-system or inter-system communications, including communications of edge device data and/or edge device behaviors. The network adapter 32 and other components of the management module 11 are typically connected to the processor via a system bus 31.

Figure 3:
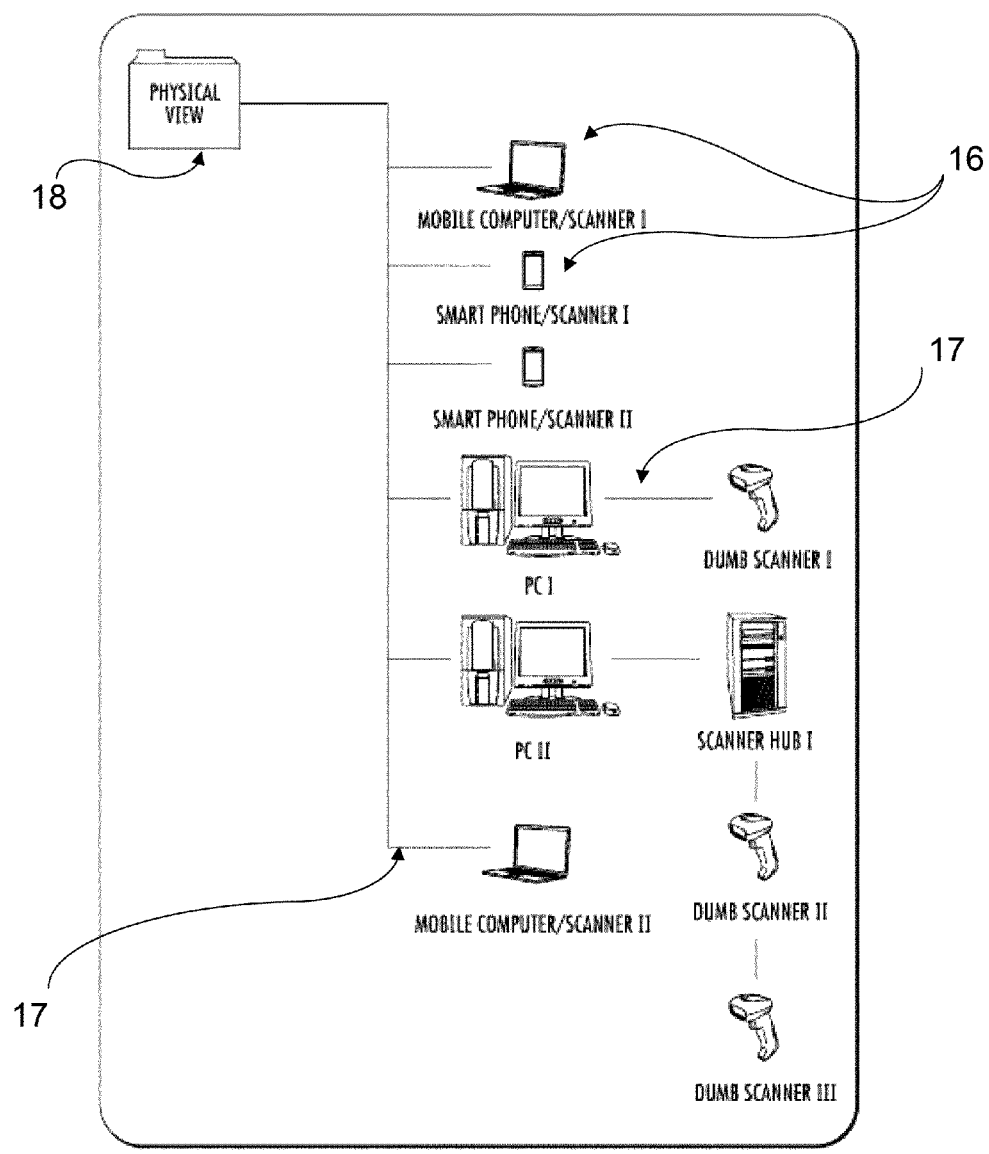
FIG. 3 depicts an exemplary physical view of the connections between a management module, intermediate devices, and scanner devices.

The management module 11 enables a user to manage various aspects of the system 10 (via, for example, the user interface 13). In this regard, the processor 25 is typically configured for displaying (e.g., with the visual display 28) a physical view of the connections between the management module 11, the intermediate devices 15, and the scanner devices 14. FIG. 3 depicts an exemplary physical view of a system 10 for managing scanner devices. The physical view typically displays the "correct" physical topology of the connections between the management module 11, the intermediate devices 15, and the scanner devices 14 in a hub and spoke configuration. Accordingly, the physical view typically includes a plurality of icons 16, each representing one of the system devices (e.g., a management module 11, an intermediate device 15, or a scanner device 14). The physical view also typically includes a plurality of markers 17 representing the connections between the various devices in the system 10. For example, each marker 17 may be a line segment indicating a connection between two devices.

In addition to the physical view, the processor 25 is typically configured for displaying (e.g., with the visual display) one or more user-defined views. Each user-defined view may include one or more logical groupings of system devices (e.g., intermediate devices 15 and scanning devices 14) that do not necessarily conform to the physical topology of the system.

A first user-defined view typically includes a plurality of icons 16, each icon 16 representing one of the management module 11, intermediate devices 15, or scanner devices 14. Within the first user-defined view, a user can create (e.g., with a command sent from the user interface 13) one or more user-defined folders 18 (e.g., a logical branch). Within each folder 18, a user may move one or more of the icons 16 and/or one or more other folders 18. For each icon 16 that represents a surrogate device 15A, the first user-defined view also typically includes an icon 16 for each intermediate device 15 or scanner device 14 dependent on the surrogate device 15A and one or more markers 17 (e.g., a line segment) representing the connections therebetween.

Although a user has some freedom in moving the icons 16 with the first user-defined group, there are typically some rules governing how the various icons 16 can be moved. In this regard, any folder 18 can be moved within any other folder 18. When a folder 18 is moved, its contents are moved with it. In addition, any device that does not depend upon a surrogate device 15A may be moved within any folder 18. In contrast, any device that depends upon a surrogate device 15A must remain attached (e.g., displayed as connected) to that surrogate device 15A.

Figure 4:
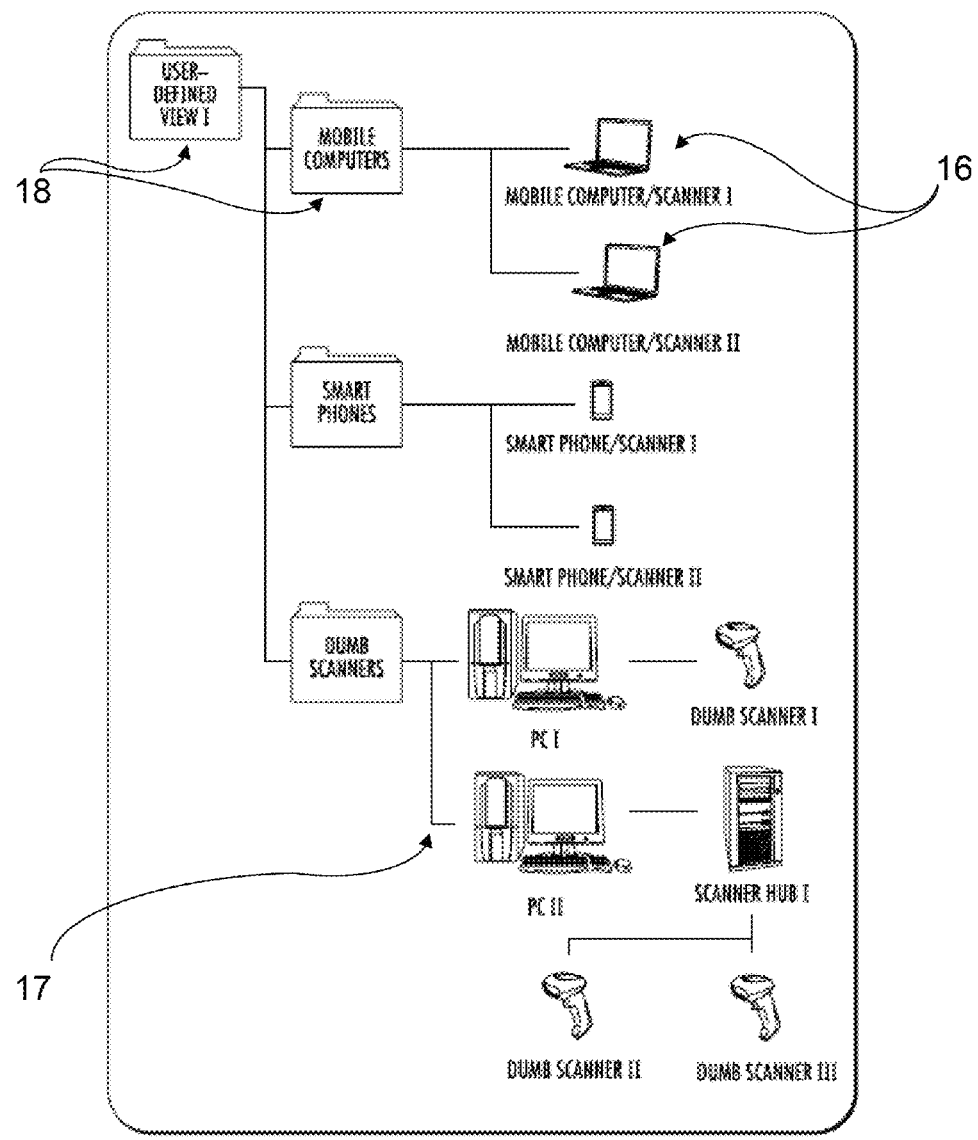
FIG. 4 depicts an exemplary user-defined view of the connections between a management module, intermediate devices, and scanner devices.

FIG. 4 depicts an exemplary first user-defined view of the system 10 depicted in FIG. 3 physical view. In FIG. 4, the various scanner devices 14 are positioned in folders 18 that correspond to their scanner type. As depicted in FIG. 4, scanner devices 14 (e.g., a smartphone with scanning capabilities) that do not depend on a surrogate device 15A may be freely positioned within a folder 18 in the first user-defined view and, thus, do not need to be shown connected to an intermediate device 15. FIG. 4 further depicts each device that requires a surrogate device 15A as being connected to such a surrogate device 15A. For example, Scanner Hub I acts as a surrogate device for Dumb Scanner II and Dumb Scanner III. Moreover, PC II acts as a surrogate device for Scanner Hub I (and for Dumb Scanner II and Dumb Scanner III).

Figure 5:
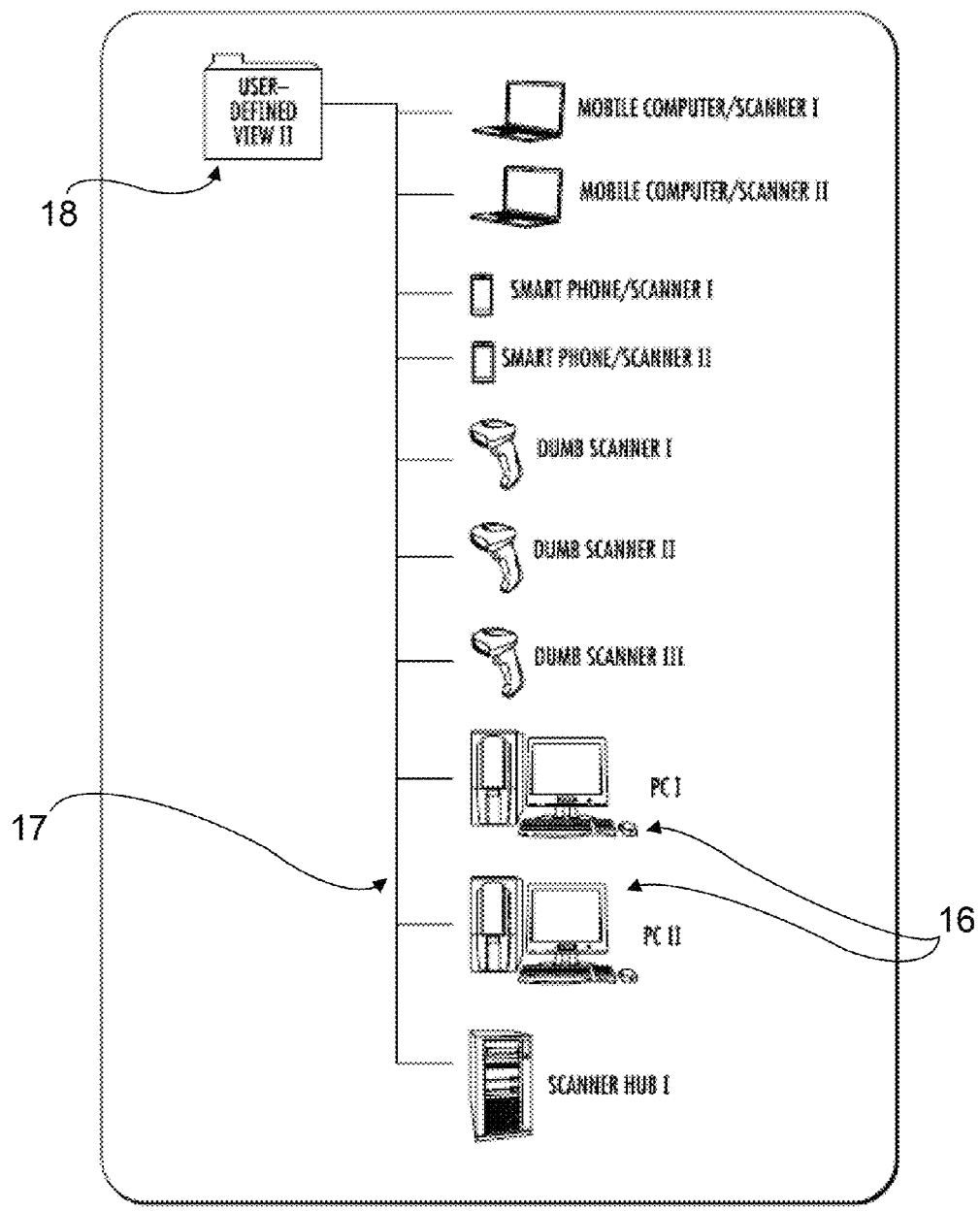
FIG. 5 depicts another exemplary user-defined view of the connections between a management module, intermediate devices, and scanner devices.

The processor 25 may also be configured for displaying a second user-defined view. This second user-defined view typically includes a plurality of icons 16, each icon 16 representing one of the management module 11, intermediate devices 15, or scanner devices 14. For example, the second user-defined view may include a plurality of icons 16, each of which is a shortcut to a device icon depicted in the physical view and/or first user-defined view. These shortcut icons are typically positioned within a single folder 18 (e.g., logical branch). Accordingly, the second user-defined view typically does not depict the connections between the various system devices. FIG. 5 depicts an exemplary second user-defined view of the system depicted in FIG. 3 physical view and FIG. 3 first user-defined view in which the various system devices are shown as shortcuts within a single folder 18.

In one embodiment, the processor 25 may be configured for detecting a change in the connections between the various system devices (e.g., the management module 11, the intermediate devices 15, and the scanner devices 14) and, thereafter, updating the physical view, first user-defined view, and/or second user-defined view to reflect a change in a connection between the various system devices.

For example, the processor may be configured to detect whether a system device has become disconnected from the management module 11. If the processor detects that a device has become disconnected, the processor may alter in each view each icon 16 representing the disconnected device to indicate that the device has become disconnected. By way of example, each view may include a fully colored icon 16 for each connected device and a greyed out icon for each disconnected device. Therefore, a user can see if a device has become disconnected and how that disconnected device was previously connected.

The processor may be further configured to detect whether a disconnected device has been reconnected. If the processor detects that a device has become reconnected, the processor may alter in each view each icon 16 representing the reconnected device to indicate that the device has become reconnected. By way of example, a greyed out icon 16, which indicated that a device was previously disconnected, may be altered to become a fully colored icon 16 to indicate that the connection has been re-established. Furthermore, if the device has been moved within the system 10 (e.g., disconnected from a first surrogate device 15A and reconnected to a second surrogate device 15A), the icon 16 representing the device is removed from its current location and relocated to its updated, correct location (e.g., to correctly show how the device is connected to other devices). Typically, this repositioning includes a reconfiguration of the markers 17 (e.g., deleting the marker 17 representing the old connection and inserting at a different location a marker 17 representing the new connection).

In addition, the processor 25 may be configured to detect when a new system device connects to the system 10. After detecting a new device, the processor 25 may alter each view to properly include the new device. Typically, this involves creating a new icon 16 visually connected with a new marker 17.

In another embodiment, the processor 25 may be configured for configuring one or more scanner devices 14 with a configuration file (e.g., a configuration file stored within the management module 11). In this regard, the management module 11 is typically capable of handling multiple known or unknown types of configuration files for multiple types of scanner devices. As such, the system 10 according to the present invention allows a user to quickly configure multiple devices connected to the system 10.

To configure one or more scanner devices 14, the processor 25 may display an icon 16 representing a scanner configuration file on the visual display 28. Next, the processor may receive a command from the user interface 13 (e.g., by mouse or touchscreen input by the user) to drag the icon 16 representing the scanner configuration file onto an icon 16 representing a scanner device 14. Thereafter, the processor 25 may configure the scanner device 14 in accordance with the scanner configuration file.

Alternatively, the processor 25 may receive a command from the user interface 13 to drag the icon 16 representing the scanner configuration file onto an icon 16 representing a surrogate device 15A (e.g., a personal computer or a scanner hub) from which one or more scanner devices 14 depend. Thereafter, the processor 25 may configure the surrogate device 15A and each scanner device 14 dependent on the surrogate device 15A in accordance with the scanner configuration file. In this way, a user can propagate the installation of a configuration file to a parent device and all of its children devices via issuing a single command through the user interface 13 (e.g., one drag and drop command).

The processor 25 may be configured for acquiring the configuration of a scanner device 14. In this regard, the processor 25 may be configured to receive a context-sensitive input from the user interface 13 to select an icon 16 representing a scanner device 14. For example, the context-sensitive input may be a right click on a mouse or a touch-and-hold on a touch screen. In response to the context-sensitive input, the processor may display on the visual display 28 a menu having the option to acquire the configuration of the selected scanner device 14. Next, the processor 25 may receive a command from the user interface 13 to acquire the configuration of the selected scanner device 14. Finally, the processor 25 may acquire the configuration of the selected scanner device 14. For example, the processor 25 may create or receive a corresponding scanner configuration file and store the scanner configuration file on the management module 11.

In one embodiment, the present system 10 for managing scanner devices may be deployed for gathering customer data (e.g., consumer feedback data). In this regard, the present system 10 for managing scanner devices may be deployed in a retail environment (e.g., a department store).

Figure 6:
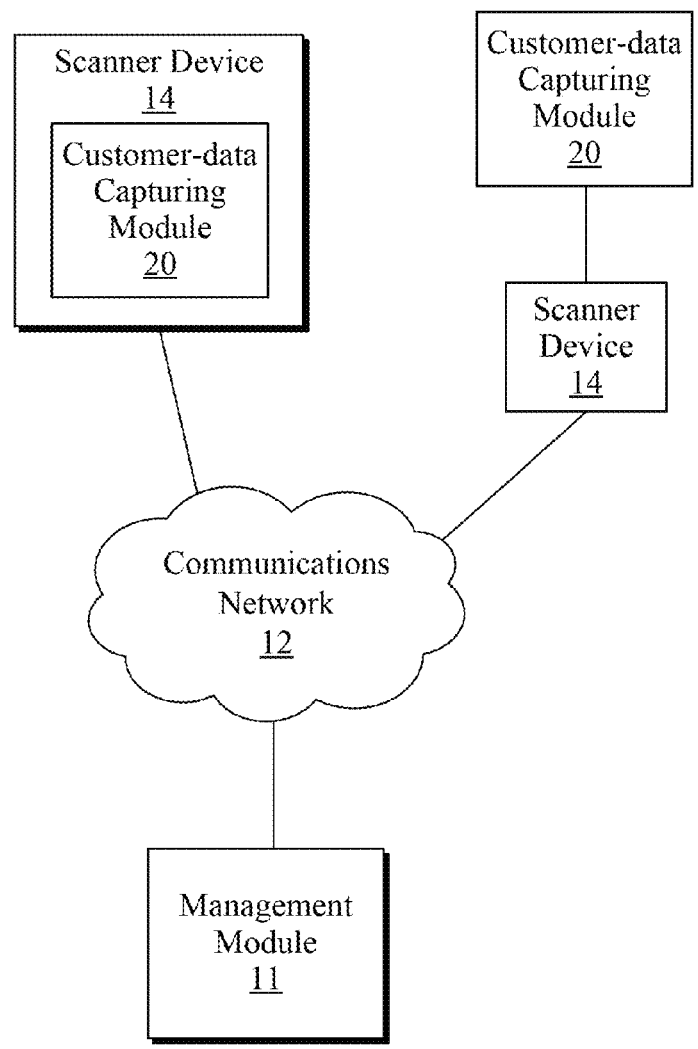
FIG. 6 depicts a block diagram of an exemplary system according to the present invention which includes a customer-data capturing module.

In addition to the foregoing described management module 11, scanner devices 14, and intermediate devices 15, the system 10 further includes one or more customer-data-capturing modules 20 in communication with the management module 11 as shown in FIG. 6. Each of the customer-data-capturing modules 20 is associated with one or more scanner devices 14. Each customer-data-capturing module 20 may be a component of a scanner device 14, a component of an intermediate device 15, or a separate device associated with a scanner device or intermediate device 15 (e.g., a separate device that is in communication with, and proximate to, one of these devices). For example, the customer-data-capturing module 20 may be a customer-facing imager (e.g., camera, single-color camera, stereo-color camera, thermal camera, etc.) that is capable of capturing customer-gesture data. The imager typically is capable of recognizing a plurality of human gestures (e.g., crossed arms, frown, hands on hip, and no movement versus heavy movement) through the use of gesture recognition technology. Each of the recognized gestures typically is associated with a customer's level of satisfaction (e.g., satisfied, unsatisfied, neutral, etc.).

By way of further example, the customer-data-capturing module 20 may be a customer interface with which a customer may volunteer (e.g., initiate) feedback information. In a particular embodiment, the customer interface may be a button pad having two buttons, with a first button for indicating that a customer is satisfied (e.g., would recommend a particular product), and a second button for indicating that that a customer is unsatisfied (e.g., would not recommend a particular product). For example, the first button may be labeled with a "thumbs up" indicator (e.g., decal, label) and the second button may be labeled with a "thumbs down" indicator.

The management module 11 is typically configured for receiving the customer data from the customer-data-capturing module 20. In addition, the management module 11 typically is configured for receiving transaction information (e.g., product type and price acquired from a barcode scan) from a scanner device 14 and/or intermediate device 15 (e.g., POS system) associated with the customer-data capturing module 20. The transaction information typically includes indicia information (e.g., data acquired by the scanner device by decoding an indicia such as a barcode). The management module typically will then correlate the customer data (e.g., customer feedback data) with the transaction information). For example, the management module 20 may analyze customer gesture information acquired at the point of sale to define probable customer satisfaction statistics with the product(s) purchased or scanned at the time the gestures were captured. In other words, as each product being purchased by the customer is scanned by the scanner device 14 at the point of sale, the customer-data capturing module 20 acquires customer data for association with the scanned product. For example, as a customer scans each product in a self-checkout line, an imager can register the customer's satisfaction level by analyzing captured gesture information. Alternatively, or in addition, a customer can depress a button indicating the customer's level of satisfaction with each product as that product is being scanned at the point of sale. This information may then be used as feedback (e.g., with a feedback module) to enhance product design and/or purchase experience, thereby increasing customer satisfaction.

Advances in the performance and miniaturization of computing technology, accompanied by an associated decrease in the cost of such technologies, has permitted the incorporation of computing power into a wide variety of edge devices such as automobiles, home appliances (e.g., microwave ovens, washing machines, refrigerators, thermostats, televisions, etc.), medical instruments, smartphones, industrial equipment, pet collars, door locks, fitness trackers, smoke alarms, and many more. It is anticipated that continuing improvements in miniaturization techniques and decreased costs, coupled with rising consumer demand, will result in a growing population of edge devices. As technology advances, manufacturers will continue to expand the universe of goods that incorporate their own data-generating power and communications network connectivity. Even goods that are presently not readily associated with computing technology (e.g., apparel), will likely one day incorporate an ability to generate data either autonomously or in association with a companion edge device (e.g., a smartphone). Radio-frequency identification (RFID) and near-field communication (NFC) are examples of technologies that may be used to allow traditionally incommunicative (e.g., dumb) devices and goods to generate data. Even mundane items such as office staplers can be implanted with an RFID tag that, when coupled to an RFID reader that is connected to a communications network, can track information about the stapler.

As the number of edge devices continues to grow, so does the amount of information being generated by these edge devices. Even edge devices that generate relatively small amounts of data (e.g., an edge device implanted with an RFID tag that only transmits an identification number) can collectively produce large amounts of data when there are great numbers of those edge devices (e.g., hundreds of thousands of units or more).

And in this information age, the information generated by these edge devices has value. Manufacturers of edge devices, for example, place a value on knowing how consumers are using their edge devices. Through the use of data analytics techniques, these manufacturers, as well as other interested parties, can mine the edge device data to provide statistics regarding a variety of interest areas. Providing manufacturers with access to data regarding how their edge device products are being used can help the manufacturers know, for example, what are the most popular (or least popular) features of their product, what are the failure rates for different components of the manufacturer's edge device, and how their products are geographically distributed. The precise nature of the information that can be obtained from a given edge device depends, of course, upon its configuration and inherent data gathering and computing capabilities, if any.

As the number of edge devices continues to grow, the total amount of data potentially made available by these edge devices likewise grows exponentially. In other words, the explosion in the population of edge devices, which is presently in its early stages, is generating a tremendous amount of edge device operational information. Some estimates suggest that by 2017 nearly half of total IP traffic will originate with non-PC devices such as tablets, smartphones, and other edge-devices. Forecasts also predict that North American IP traffic, for example, will increase to three times current levels by 2017.

There are two primary challenges to creating a system for managing data related to edge devices. First, any system seeking to manage this information must account for the disparate nature of the edge devices that results in the generation of heterogeneous data. In particular, different edge devices are likely to have different operating systems, different programming languages, and different ways of organizing and representing their data. Consequently, any system attempting to interface with these disparate edge devices must be able to successfully process their associated heterogeneous data while maintaining system scalability, efficiency, and usability.

Second, the system must incentivize owners of edge devices to connect to the system so that the data from their edge devices can be gathered and processed. If a sufficient percentage of owners of edge devices do not connect their edge devices to the system so that their data can be accessed, then the body of data gathered by the system will be insufficient to satisfy the needs of manufacturers (e.g., producers) or other parties interested in benefitting from the information gleaned from edge devices participating in the system. In other words, an impetus must exist to drive owners to connect edge devices to the system so that a critical mass of data can be gathered that is sufficient to support a meaningful analysis.

To satisfy these requirements, the system according to the present invention provides an extensible, modular communication architecture that allows for data related to edge devices to be sent and received on a system-wide basis. This is accomplished by system components that are engaged in the translation of incoming data into a standardized format as well as the routing of data to appropriate destinations within and without the system.

In addition, the system incentivizes consumers to connect edge devices to the system by providing them the opportunity to increase the functionality, usability, and customizability of their edge device as a benefit of connecting the edge device to the system. Consumers are given the opportunity to access the edge device behaviors of their edge devices through plug-in applications made available by the system. While a consumer may be provided with out-of-the box access to a certain subset of a given device's edge device behaviors, the needs of individual consumers may be different. Some of these needs may not be met by the out-of-the box configuration of behavior controls. In these situations, consumers of edge devices require more customizable and more complete access to the behaviors of their edge devices. Edge device plug-in applications can provide greater access to an edge device's data and behaviors by allowing customized and/or enhanced access to the edge device (versus an out-of-the box configuration, for example).

The system according to the present invention creates a platform that facilitates the exchange of edge device data and edge device behaviors. More particularly, the present system serves as the foundation for an exchange or marketplace wherein data producers (e.g., owners or operators of edge devices) provide data consumers (e.g., manufacturers of edge devices, vendors of edge devices, marketing companies, etc.) with access to their edge device data in exchange for access to edge device behaviors afforded by plug-in applications provided by the data consumers. Although the terms data producer and data consumer are used in this disclosure, it will be understood that these terms are used for convenience only. A data consumer, for example, is intended not only to refer to a manufacturer of a particular edge device, but is intended to cover more broadly any person or entity with an interest (e.g., a financial interest) in securing access to edge device data in exchange for providing one or more plug-in applications that provide a data producer with greater access to edge device behaviors capable of controlling the data producer's edge device. Similarly, data producers covers not only the owner of an edge device, but any person or entity with the ability (e.g., authority) to provide a data consumer with access to data generated by an edge device in exchange for plug-in applications that may provide additional behaviors or access to the edge device.

Figure 7:
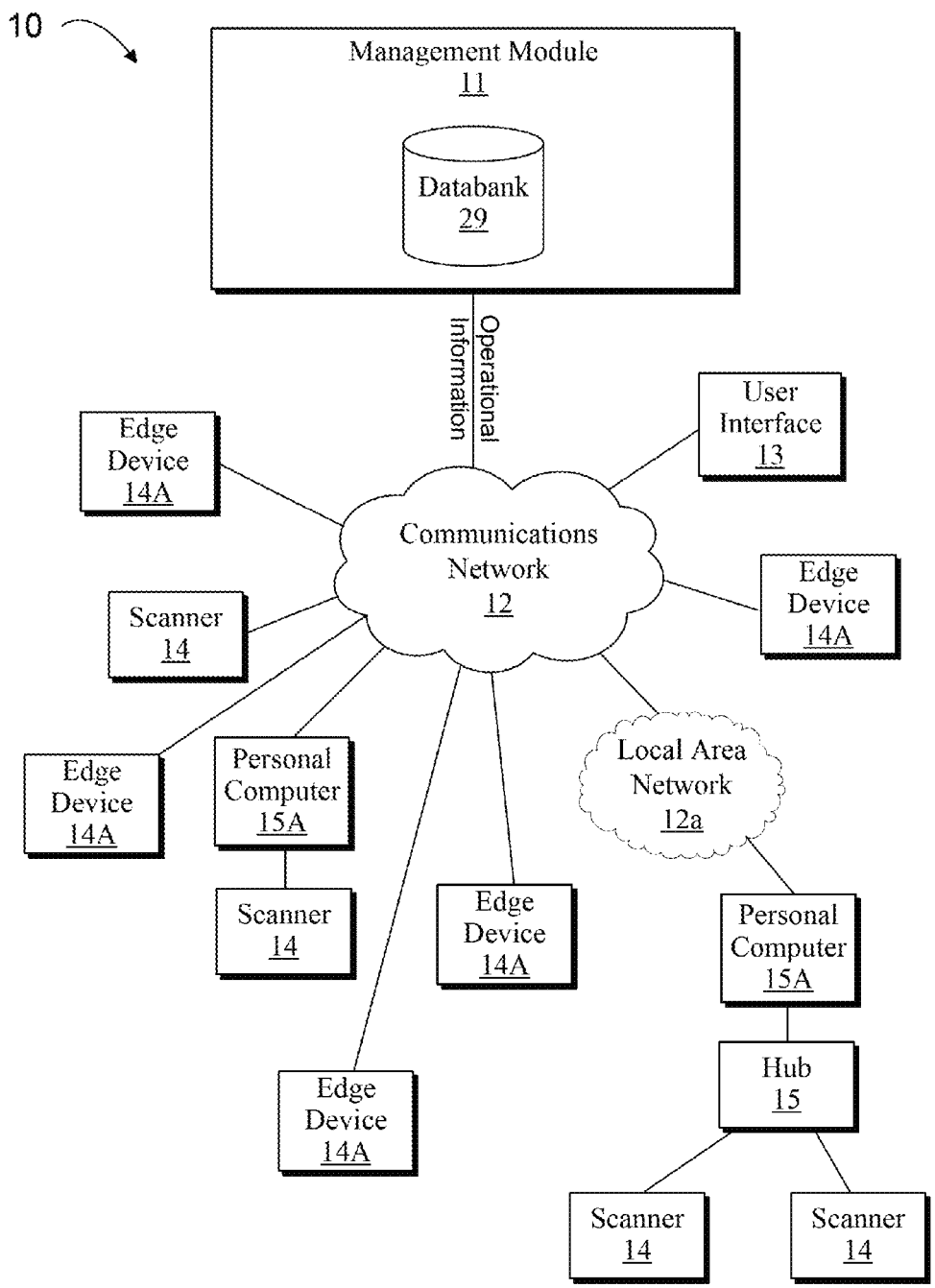
FIG. 7 depicts a block diagram of an alternative embodiment of an exemplary system according to the present invention.

Therefore, in another aspect, the present invention also embraces a system for intelligent management of edge device operational information. The management module 11 of the system 10 according to the present invention receives operational information from a plurality of distributed scanner devices 14 (or, in some embodiments, other types of edge devices 14A) via the communications network 12 as shown in FIG. 7. The operational information transmitted by each of the scanner devices 14 may include two primary types of information: device data and/or device behaviors.

Edge devices have the capacity to generate varying amounts and types of device data. Device data may include data gathered by the edge device (e.g. via sensory input, user input, etc.). For example, device data may include data gathered from a scanner device's decoding of an indicia (e.g., reading a barcode). By way of further example, device data may include data that has been input into the scanner device 14 by a user (e.g., alphanumeric text entered via a keypad, digital signatures entered via the scanner devices touchscreen, etc.). Device data may also include data generated by the scanner device 14 from other data, including the output of calculations performed on data received by the scanner device 14. Typically, scanner devices 14 having greater computing power (e.g., smartphones having indicia-reading capabilities), will be capable of generating more device data (e.g., more types of device data) than a scanner device with less computing power (e.g., a "dumb" scanning device). For example, a smartphone may generate a substantial amount of device data relating to the smartphone's geographical position at various points in time (e.g., geo-location data gathered via global positioning satellite (GPS) technology), call detail records (e.g., call duration, time-to-connect, etc.), Short Messaging Service (e.g., text messaging) data, as well as usage data relating to the applications stored on the smartphone, just to name a few.

Other edge devices are capable of generating various types of device data. An intelligent thermostat may generate device data regarding user-preferred temperature settings, the time it takes for the system to achieve a desired temperature setting, power consumption, as well as actual temperature readings at various times. An intelligent automobile may generate device data regarding vehicle speed, braking, engine performance, gas mileage, and vehicle maintenance. An intelligent sneaker may gather edge device data indicating how many steps are taken in the shoe before the sole begins to fail. An intelligent elevator may generate data on how many occupants are inside at any given time, the total weight being transported by the elevator car, or the average number of elevator calls made per unit of time.

An edge device may also generate device metadata. Edge device metadata represents a description of the information being gathered and/or manipulated by the edge device. Device metadata represents a summary description of the raw device data. For example, an exemplary file containing device data from an intelligent refrigerator may contain 10,000 temperature readings taken over a period of thirty days. Rather than reviewing all of the device data to determine that there are indeed 10,000 temperature readings present, the device metadata can summarize the device data by providing a short statement indicating that there are 10,000 temperature reading data points in the overall device data. In other words, the device metadata provides a short description of the larger body of device data, thereby providing a more efficient way of determining the qualities of a given set of device data. For purposes of this disclosure, device data may include edge device metadata.

Operational information may also include device behaviors. Device behaviors can be used to alter the state of a scanner device 14 (or any other edge device 14A connected to the system 10), or simply to access the scanner device 14. Device behaviors are constructed of vocabularies that are recognized and acted upon by the scanner device 14. In some embodiments, device behaviors can be computer methods or subroutines. For example, a scanner device 14 may have a set of device behaviors that include methods for changing the state of the scanner device to activate the laser to read a barcode, increase the gain of the signal reflected from the insignia (e.g., to compensate for greater distances between the reader and indicia), power down the laser to conserve power, or adjust the sweep angle of the laser, among others. By way of further example, and to help illustrate the application of the present invention to other types of edge devices, an intelligent thermostat may have behaviors for turning the device on or off, changing the temperature setting, and setting or modifying a schedule of temperature settings (e.g., setting different temperatures for different parts of the day). An exemplary set of device behaviors (e.g., methods) for a thermostat may include "setTemp," "setPower," and/or "setTimer." In other words, the device behaviors include vocabularies for interfacing with the edge device.

The vocabularies of the edge devices 14A are those words, symbols or other indicators used by the edge device to describe data or understood by the device as edge device commands. For example, an intelligent elevator might have the word "grosWt" in its vocabulary, which the edge device uses to indicate the total weight being carried in the elevator car at any given moment (e.g., grosWt=300 means the car is carrying 300 kilograms). Any software application interfacing with the edge elevator would need to understand the vocabulary term "grosWt" to be able to understand the data being generated by the edge elevator.

Figure 8:
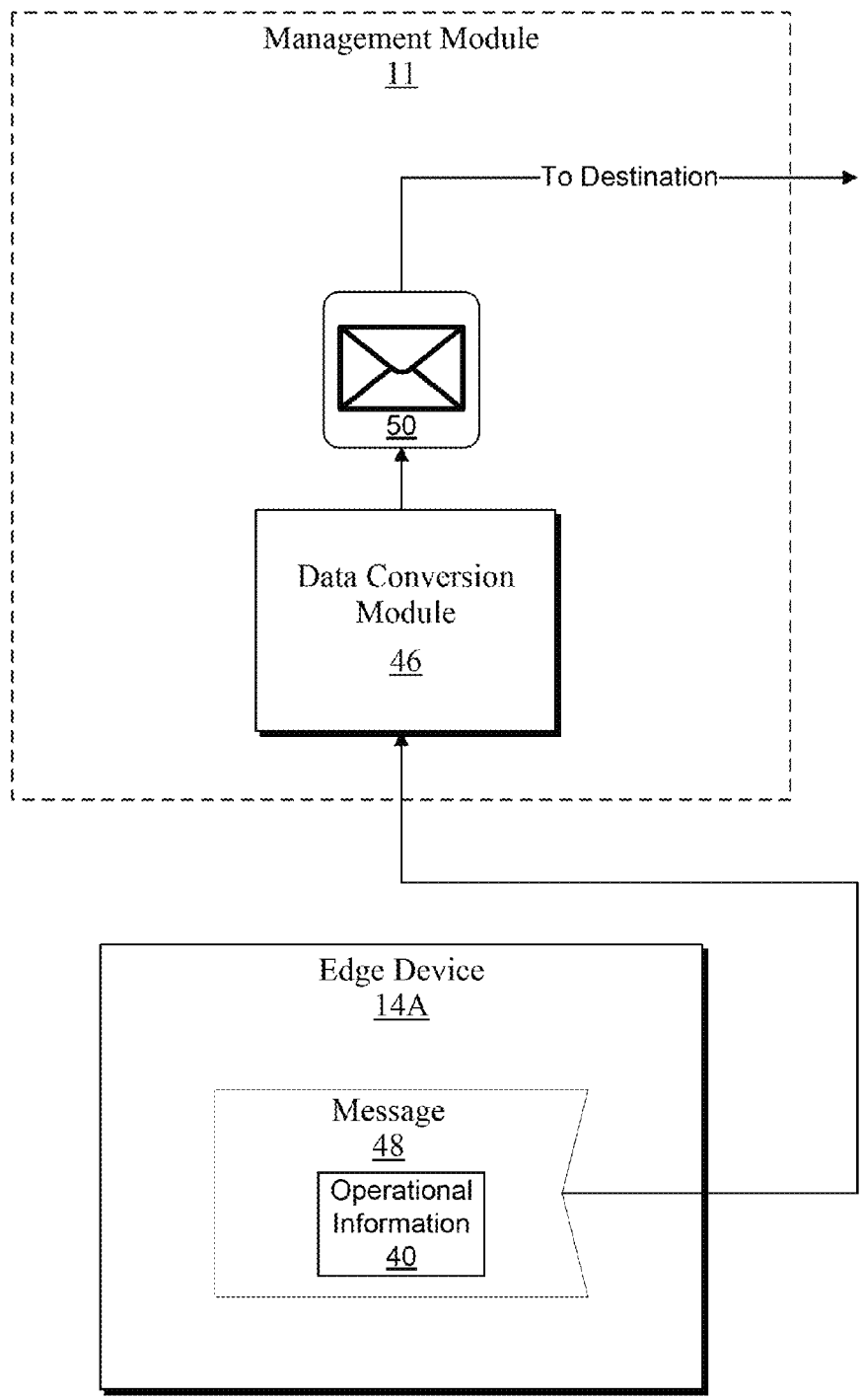
FIG. 8 depicts a block diagram of an exemplary data conversion module of the system according to the present invention.

Reference is now made to FIG. 8. To facilitate exchange of information, including operational information, between system components, including between the management module 11 and scanner devices 14, the management module 11 includes one or more data conversion modules 46 (e.g., data conversion program modules). A data conversion module 46 serves as an interpreter for any scanner device 14 (or any other edge device 14A, system component, application, program module, etc.) that sends a communication (e.g., message) to the management module 11 via the communications network 12. Because different types of edge devices, including different types of scanner devices 14, typically employ different data formats for representing their respective operational information, including different vocabularies for representing (e.g., describing) that operational information, the data conversion module 46 conforms all messages, including messages containing operational information, to a data format that can be understood by one or more system components that will receive the message. Therefore, the system 10 uses data conversion modules 46 to map heterogeneous data formats, interfaces, and protocols into a common data model and format. As a result, data conversion modules 46 effectively hide the inherent data heterogeneity present within the system 10, thereby facilitating communications between system components.

To convert each message 48 (e.g., object, instance, data packet) containing operational information 40 transmitted to the management module 11 by the networked, disparate scanner devices 14, or other edge devices 14A, the system employs one or more data conversion modules 46 to (i) receive the message 48, (ii) convert the message 48 into a common messaging container, and (iii) transmit the message 48 within the common messaging container 50 to the appropriate broker module (discussed below) to process and/or route that particular message 54. Typically, a different data conversion module 46 is needed for each type of edge device, module, or application (e.g., plug-in application) that needs to interface with the management module 11.

After a data conversion module 46 receives a message 54 from a scanner device 14 or other edge device 14A, the data conversion module 46 converts the operational information 40 into a common messaging container 50 according to a set of encoding rules (e.g., encoding protocol, encoding standards, formatting standards) implemented by the data conversion module 46. Typically, the common messaging container 50 will include a header portion for providing information about, for example, the source of the operational information 40 embedded in the common messaging container 50. The data conversion module 46 may add other information to the header portion of the common messaging container 50, including timestamp and destination information (e.g., destination IP address, port number, etc.).

Typically, when creating a common messaging container 50, the data conversion module 46 uses the vocabulary prescribed by its own encoding protocol to describe, for example, the operational information 40 embedded in the common messaging container 50. In other words, rather than describing the operational information 40 received from the scanner device 14 or other edge device 14A in the native vocabulary of the sending device, the data conversion module 46 translates the device's native vocabulary into the data conversion module's vocabulary such that destination modules can understand the contents of the common messaging container 46.

Alternatively, when creating a common messaging container 50, a data conversion module 46 may include all or portions of the operational information 14 in the scanner device's own native vocabulary (e.g., raw data, binary or unparsed data, etc.). Typically, the data conversion module 46 creates header information indicating that the common messaging container holds operational information 40 in its native format, and it may provide instructions for retrieving or handling the data. In this way, the common messaging container 50 serves as an envelope (e.g., wrapper) for the operational information 40 in its native format. This envelope approach allows for the native (e.g., raw) operational information 40 to be transported throughout the system 10 to its proper destination, including, for example, the databank 29 containing a repository of all operational information 40. This approach may be less desirable, however, because it preserves device data 42 in a native format that may not be understood by the management module 11, thereby inhibiting the ability of the management module 11 to query the device data 16 enveloped in the common messaging container.

Note that data conversion modules 46 may be configured to place other messages 48 besides those carrying operational information 14 into a common messaging container 50. For example, any message 48 required to be delivered between disparate components of the system 10 (e.g., disparate edge devices 15A, applications or other components) will typically be embedded within a common messaging container 50 by a data conversion module 46. In other words, a data conversion module 46 may be configured to package within a common messaging container 50 instances of device operational information 40 (e.g., objects) and/or other types of messages 48 (e.g., service requests).

Having received the edge device's operational information 40 and converted it into a common messaging container 50 that can be transported (e.g., transmitted) throughout the system 10, the message 48 (now in the form of a common messaging container 50) that has the operational information 40 embedded within it (natively or in translated form) may be passed along to a broker module 49.

Figure 9:
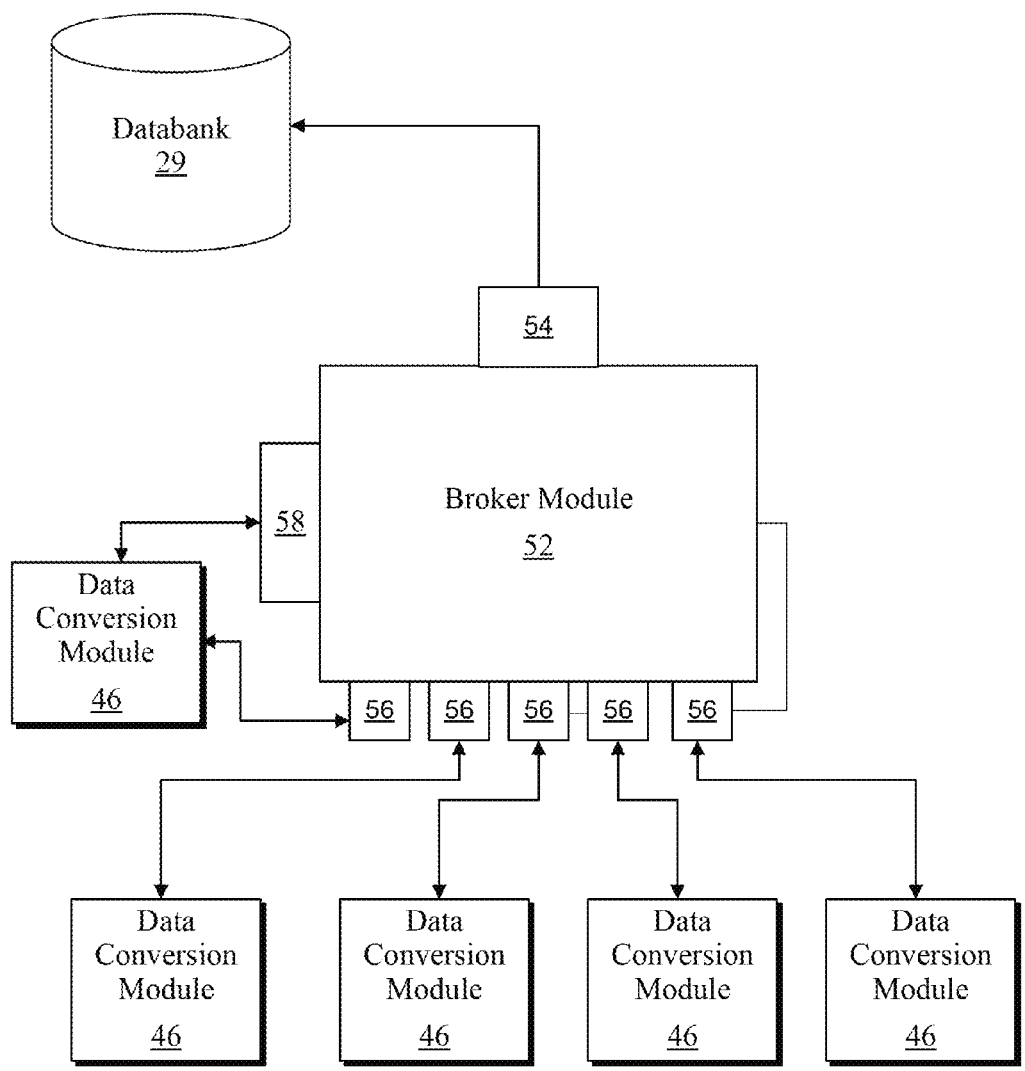
FIG. 9 depicts a block diagram of an exemplary broker module of the system according to the present invention.

Generally speaking, where there are N different system components (e.g., applications), the number of interfaces (e.g., links) between the N applications is $(N^2-N)/2$. Consequently, as N gets larger, there is exponential growth in the number of possible interfaces between components. This illustrates the problem with creating a point-to-point architecture for the connection of edge devices and other system components. The point-to-point architecture is non-scalable and quickly leads to what is commonly called a "spaghetti architecture" with an unwieldy number of interfaces. To avoid this problem and to promote scalability, in one embodiment, the system according to the present invention adopts the usage of message brokers to facilitate the integration of disparate edge devices and other components of the system. Referring now to FIG. 9, the management module 11 may include a broker module 52 (e.g., broker server(s)). The broker module 52 provides message-brokering facilities (e.g., brokering facilities). These brokering facilities include message-processing services (e.g., message transformation, message warehousing, and content-based routing) and message-filtering services. Message-processing services include routing the message to a destination based upon the content of the message and/or transforming the message by changing the contents of the message (e.g., adding to and/or removing information from the message). Message-filtering services provided by the broker module 52 prevent or allow messages (e.g., messages embedded in common messaging containers) to reach specified destinations. Through the use of multiple broker modules 52, the management module 11 can accommodate the interconnection of a large number of disparate scanner devices 14 and other edge devices 14A.

Broker modules 52 typically include three types of connections for communicating with system components. First, broker modules 52 have a databank connection 54 for recording all transactions (e.g., messages) received by the broker module 49. Second, broker modules 49 have at least one data conversion module connection 56 for interfacing with data conversion modules 46 that pass common messaging containers 50 to broker modules 52, or for receiving common messaging containers 50 from a child broker module 52. Broker modules 52 can have any number of data conversion module connections 56 to facilitate interfacing with various types of data conversion modules 46 (e.g., HTML data conversion modules, edge device conversion modules, etc.). Third, broker modules 52 have an access connection 58 for facilitating the addition of data conversion module connections to the broker module 52, for querying information about the broker module 52, and for asking the broker module 52 to provide various services (e.g., tasks).

Broker modules 52 may use different techniques for interconnecting disparate edge devices and modules. In an exemplary embodiment, the broker modules 52 may adopt a publish-subscribe model in which messages are published to a corresponding "channel." System components (e.g., messaging clients) wishing to have access to the messages 48 published to that channel must "subscribe" to the channel to be eligible to receive the information stored in those messages 48. In this way, the broker module transmits a message to a messaging client only if the message meets the predefined parameters (e.g., the message relates to a specified channel) published by the messaging client to the broker module. For example, an intelligent scanning device 14 may publish to the management module 11 that it has successfully read a barcode (e.g., a scan event message). This scan event message is transmitted to the management module 11, packaged within a common messaging container 50 by a data conversion module 46, and then identified by a broker module 52 as belonging to a scan event channel. Subsequently, any subscriber (e.g., device, module, application, service, client, etc.) that subscribes to that channel will have access to the particular scan event.

Figure 10:
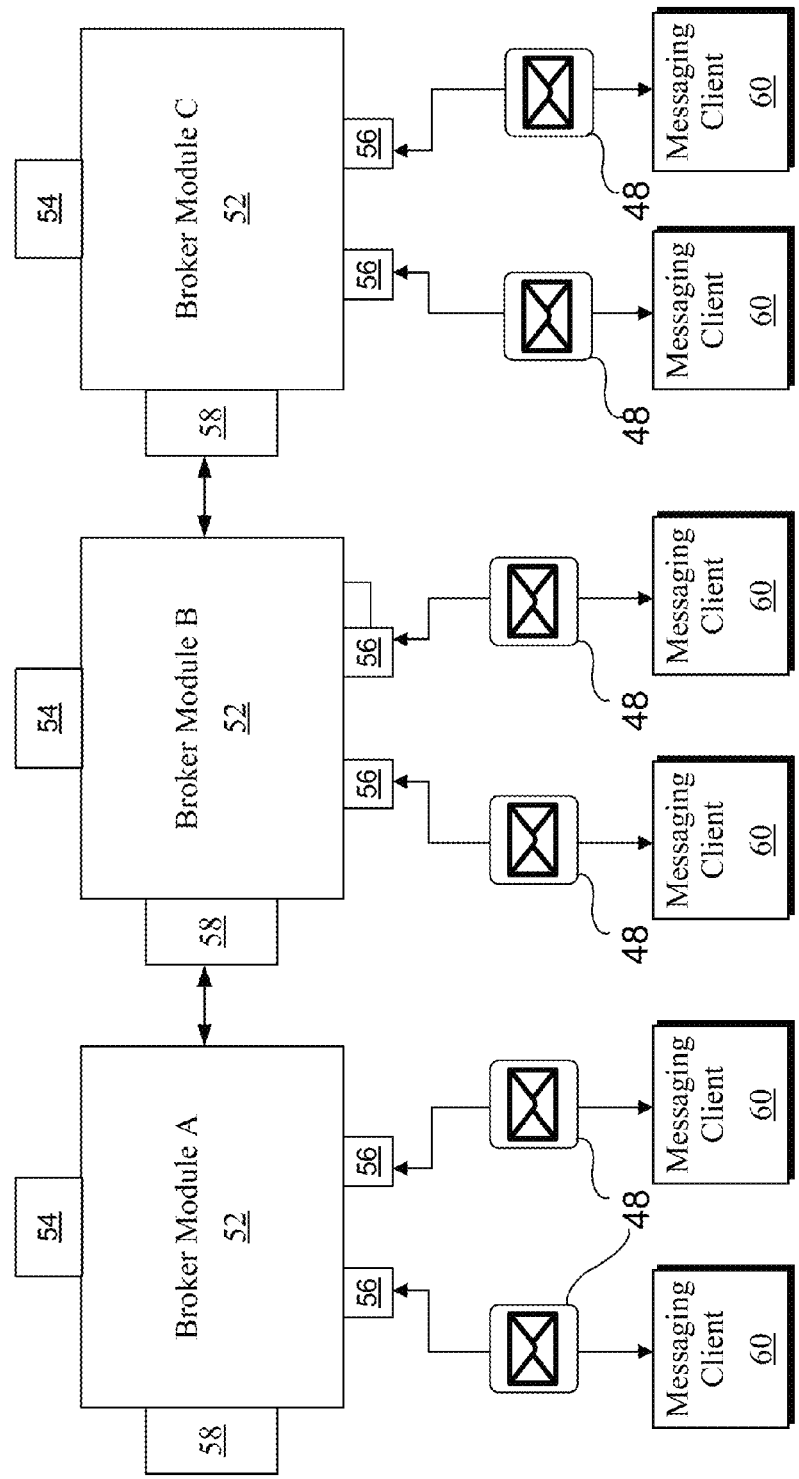
FIG. 10 depicts a block diagram of exemplary chained connections between a plurality of broker modules of the system according to the present invention.

The use of broker modules 52 creates a system architecture that is inherently extensible and allows the management module 11 to meet the communication-intensive nature of the system 10 wherein communications typically span disparate domains. Adding to the system's extensibility, broker modules 52 may be configured to be clients of other broker modules 52. This allows for the "chaining" of broker modules 52 in a way that facilitates communication between disparate domains (e.g., disparate edge devices), while maintaining simplified and modular system administration. FIG. 10 is a block diagram illustrating a chaining of three exemplary broker modules 52. In this example, if a messaging client 60 of Broker Module B wants to receive messages 48 sent by messaging clients 60 of Broker Module A, then Broker Module B's messaging client 60 subscribes with Broker Module B. Broker Module B, in turn, subscribes to receive the same type of messages 48 from Broker Module A. Having established this chain, whenever one of Broker Module A's messaging clients 60 publishes a message 48 of the type requested by Broker Module B's client, then Broker Module A will deliver (e.g., transmit) the message 48 to Message Broker B in accordance with the subscription. Typically, as soon as Message Broker B receives the message 48, it will deliver it to all of Broker Module B's messaging clients 60 that have subscribed for that type of message 48.

There are numerous advantages to employing broker modules 52 for facilitating the intra-system and inter-system transfer of heterogeneous data generated from, for example, disparate edge devices 14A. First, broker modules 52 allow for asynchronous message delivery in that the message-sender and message-receiver need not be connected to the system (e.g., through a connection to the communications network 12) at the same time. This is possible because broker modules 52 employ persistent storage (e.g., dedicated hard disk space) to back up the message queues, thereby enabling the broker modules 52 to deliver a message at a later time (e.g., when the destination device connects to the communications network 12).

Second, a broker module 52 can transform the messages 48 that it receives. Because the system 10 typically seeks to preserve operational information 40 so that it may be later accessed (e.g., by user queries), broker modules 52 send a copy of all messages 48 containing operational information 40 to the databank 29. But broker modules 52 have the added capability of being able to transform messages 48 en route to the message's destination. As a message 48 flows through a broker module 52, the broker module 52 can intercept the message 48 and transform the message 48 into a new or different message 48 according to a set of rules. For example, the broker module 52 may truncate, rearrange, or translate the operational information 40 contained in the message 48 according to the needs of the particular broker module's messaging client 60.

Third, broker modules 52 are capable of filtering messages 48 to partition messages to sub-domains of the system 10. Typically, a message broker 52 by default allows messages 48 for all destinations to pass through. Each broker module 52 can be configured, however, to only allow messages 48 for specific destinations to pass. For example, a broker module 52 can be configured to only deliver a message 48 to a messaging client 60 (e.g., subscriber) if the contents of the message 48 match the parameters set by the messaging client 60. Filtering messages can prevent the message broker's messaging client 60 from being inundated with irrelevant messages 48 which may inhibit system performance.

The management module 11 is further configured to perform queries (e.g., database queries) of the databank 29. A user can access the data stored in the databank 29 by submitting a query for processing by the management module 11. Typically, a user queries the databank 29 by entering the query via the user interface 13, which may be any computer device having a user interface that is connected to the management module 11 via the communications network 12. Exemplary computers that may be used to submit a databank query include desktop computers, laptop computers, tablet computers, and smartphones. Users may enter their databank query using, for example, a keyboard or touchscreen. Typically, the management module 11 provides a graphical user interface (e.g., a search box) allowing a user to enter a natural language search query. The user may be required to sign into the system 10 prior to submitting a query, and the user's access to the system may be limited to the retrieval of only certain data depending on the user's credentials. The user query is received by the management module 11. The management module 11 may convert the natural language query into a formal query language before executing the query of the databank 29. The management module 11 queries the databank 29 and returns the results of the query to the user via the user interface 13 (e.g., displayed on the visual display 28).

By way of example, a user may wish to query the system 10 for the amount of scanner devices 14 that the user's company has located at a specified facility. The user might enter the following exemplary query using the user interface 13: "What scanner devices are at the Smith Warehouse?" The user interface 13 transmits this natural language query to the management module 11. The management module 11 typically converts the natural language query to the query language used by the management module 11. The management module 11 executes the query and retrieves from the databank 29 the data that is responsive to the query (e.g., the query results).

In addition to allowing system users to obtain data from the databank 29 by submitting queries for processing by the management module 11, the processor 25 of the system 10 according to the present invention also provides the capability of returning a list of plug-in applications that are capable of understanding the vocabulary of the scanner device(s) 14, or other edge device(s) 14A, that is addressed (e.g., referenced) by the query and/or the query results. In other words, if the query and/or query results contain a reference to a particular type of scanner device 14, then the management module 11 will also return to the user interface 13 (or otherwise provide to the user) a listing of those plug-in applications that are compatible with that particular type of device. In this way, the management module 11 provides an efficient and intelligent means for identifying to a user those plug-in applications that may be useful to a user in conjunction with the operation of their device. The plug-in application may provide the user with functionality for analyzing the operational data generated by their scanner device 14, for controlling the operations (e.g., behaviors) of the scanner device 14, or any other functionalities that the designers of the plug-in application (e.g., device manufacturers or third-party vendors) may incorporate.

In addition to providing a listing of device-compatible plug-in applications in response to a user's query of the databank 29, the management module 11 generally also provides means for acquiring the plug-in application. For example, the management module may provide a hyperlink to a URL where the plug-in application may be acquired. In an alternative embodiment, the management module 11 facilitates access to the plug-in application through application service provider constructs (e.g., software as a service).

Figure 11:
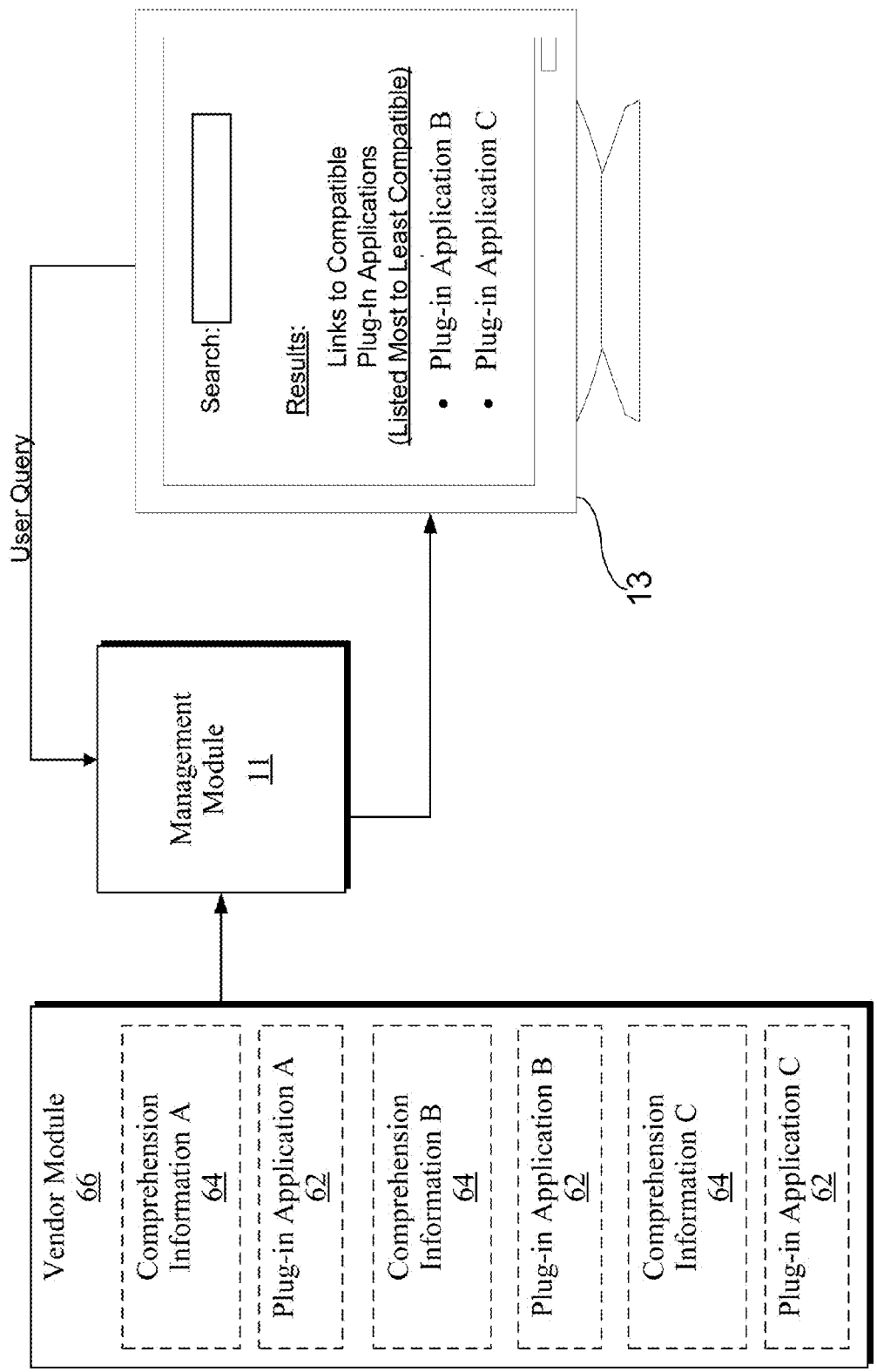
FIG. 11 depicts a block diagram illustrating an intelligent query of the databank of the system according to the present invention.
Figure 12:
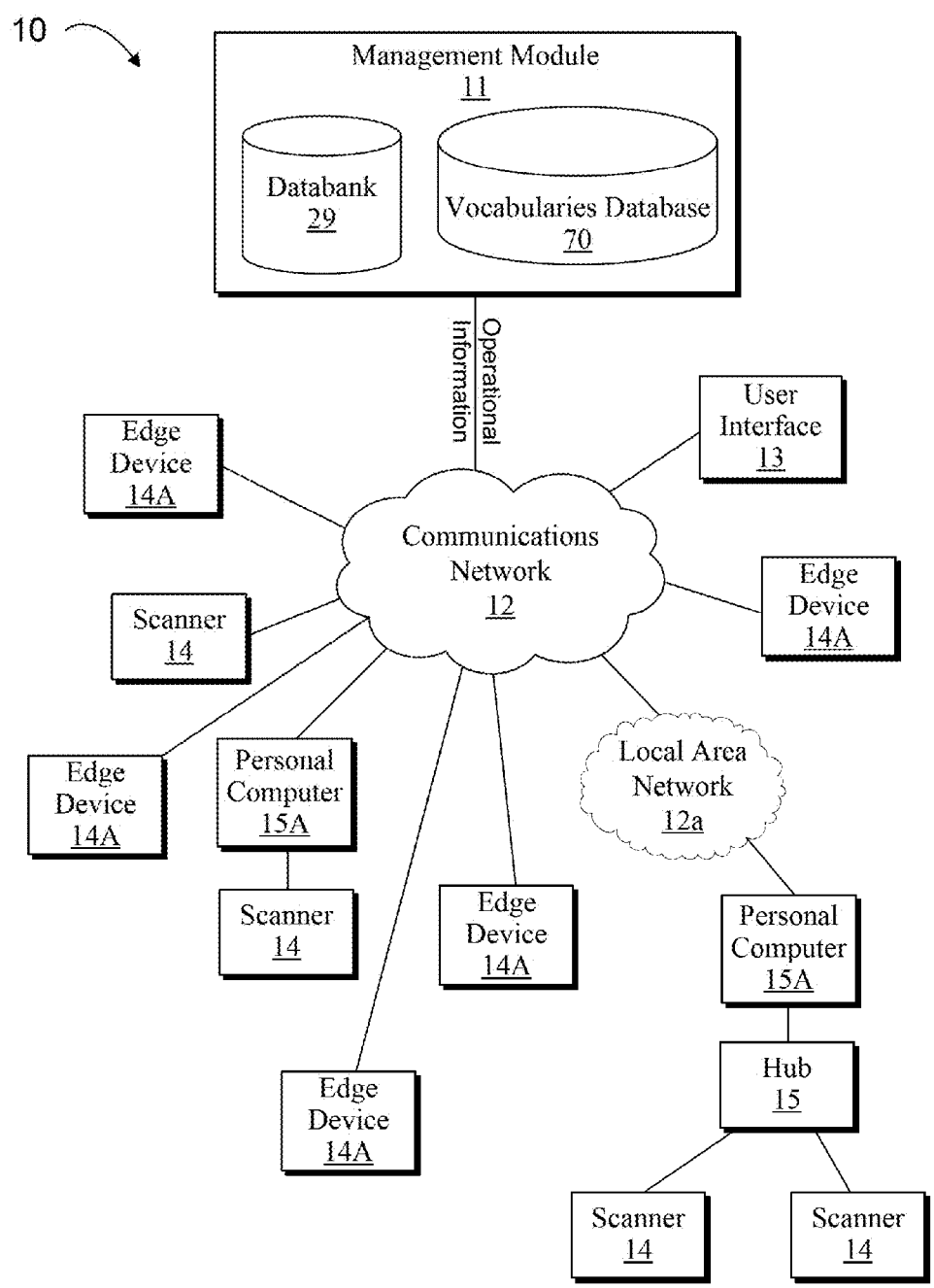
FIG. 12 depicts a block diagram of an alternative embodiment of the system according to the present invention that includes a vocabularies database.

As shown in FIG. 11, the management module 11 identifies those plug-in applications 62 that are compatible with any scanner device 14 or other edge device 14A identified in the query results from the databank 29 by acquiring comprehension information 64 with respect to each plug-in application 62. Typically, the comprehension information 64 is acquired by the management module 11 from a vendor module 66. The vendor module 66 typically stores plug-in applications 66 (e.g., plug-in applications created by device manufacturers, third-party software designers, or other plug-in application vendors) as well as comprehension information 64 relating to each plug-in application 62 stored therein. Comprehension information 64 typically includes an identification of particular vocabularies (e.g., vocabularies that describe device data and device behaviors) that a plug-in application understands. In this way, the system 10 is able to store comprehension information 64 indicating the edge device vocabularies understood by each of the plug-in applications 62 to be made available to system users who have appropriate credentials.

When the management module 11 obtains the results of the user's query of the databank 29, it compares the query with the comprehension information 64 acquired from the vendor module 66 (e.g., from a comprehension information database). Upon determining which, if any, plug-in applications 62 are capable of understanding at least a portion of the vocabularies that are used by the edge devices 14A referenced in the query and/or query results, the management module 11 returns a listing of those plug-in applications 62 for display to the user via the user interface 13.

In an exemplary embodiment, the management module 11 also acquires a plug-in application interface for each plug-in application 62. A plug-in application interface is configured to allow the management module 11 to communicate with the plug-in application 62 via the communications network 12. The developer of the edge device plug-in application (e.g., a device manufacturer) will usually make the plug-in interface available to the system 10 so that the management module 11 will be able to interface with the developer's plug-in application 62, thereby making it possible for the developer's plug-in application 62 to be among those plug-in applications 62 potentially chosen by a user for accessing and/or controlling the user's edge device 14A. In other words, developers of plug-in applications 62 are incentivized to include their plug-in application interface in the system 10 because doing so enables the management module 11 to link users to that developer's plug-in application 62.

When the management module 11 identifies a particular plug-in application(s) 62 as being capable of understanding some/all of the vocabularies present in the query and/or query results, the management module 11 interfaces with the corresponding plug-in application 62 using the appropriate plug-in application interface. Via the plug-in application interface, the management module 11 acquires from the plug-in application 62 a visual rendering of the query results that contain parts of the vocabularies from edge devices 14A that the plug-in application understands. The management module 11 displays these visual results to the user via the user interface 13 (e.g., a graphical display on the visual display). By displaying the visual rendering of the query results that a plug-in application 62 understands to a user, the system 10 provides the user an understanding of how effectively the plug-in application will be able to interface with the user's edge device 14A. Where the management module 11 identifies multiple plug-in applications 62 that are capable of understanding at least some of the vocabularies in the query results, the management module 11 ranks the plug-in applications 62 according to their degree of understanding (e.g., the percentage of the vocabularies that they understand). In this way, a user can evaluate which plug-in applications 62 will be most/least effective at interfacing with the user's edge device 14A in the desired way.

When amassing extremely large amounts of data from an extremely large number of edge devices, efficiency in describing the data is particularly important. The selection of a vocabulary for use by an edge device 14A, for instance, in describing the data that it generates or the behaviors that control the device can be important to the device's ability to be fully and effectively utilized in a networked environment. In one embodiment of the system 10 according to the present invention, therefore, the management module includes a vocabularies database 70. The vocabularies database 70 stores different vocabularies that can be used with different edge devices 14A. In other words, the vocabularies database 70 is a repository of the different vocabularies that can be used to describe the device data 42 and device behaviors 44 of an edge device 14A. Typically, the vocabularies database 70 will store a plurality of vocabularies capable of being used in conjunction with any given device. Typically, the vocabularies database 70 is populated by the submissions of device vocabularies by device manufacturers (e.g., developers). When a manufacturer creates a device, it determines the vocabulary that will be used to describe the device data and device behavior. The manufacturer may upload the vocabulary used for a given device to the vocabularies database 70. The vocabularies in the vocabularies database 70 may be subsequently incorporated into the development of other devices whose developers wish to incorporate some or all of a desired vocabulary. Over time, manufacturers will tend to gravitate to using in their devices those vocabularies that prove to be the most efficient, most effective, most descriptive, and easiest to interpret and otherwise utilize within the system. In other words, over time, edge devices 14A will tend to incorporate (e.g., be programmed to utilize) those vocabularies that are deemed the most efficient, effective, or otherwise desirable in describing the device data 42 and device behaviors 44. In this way, the system's incorporation of a vocabularies database 70 facilitates the crowd sourcing of device vocabularies whereby communities of device developers cooperate (explicitly and implicitly) in the creation of the most useful vocabularies.

In an alternative embodiment, the management module 11 is configured to store the topology of the components of the system 10. More particularly, the management module 11 tracks the status of the connections between broker modules 52 and edge devices 14A. Typically, the management module 11 is configured for displaying to the user via the user interface 13, substantially in real time, the connections between broker modules 52 and edge devices 14A. The management module 11 usually displays the topology of these connections in a graphical user interface with icons 16 representing the individual broker modules 52 and edge devices 14A, and markers 17 indicating the status of the connections.

As mentioned, a wide variety of edge devices exist that are capable of generating large amounts of diverse types of operational information. This operational information can come in the form of binary data accessible at ports already built into the device but used for purposes other than transmission of the data over a communications network for use by disparate domains. For example, some edge devices may have a diagnostics port that allows access to the edge device's operational information only by specialized diagnostic domains. To enable the edge device to exchange operational information with other, disparate edge devices and other components and systems over a communications network, it is generally necessary to employ a communications adapter. To be able to interface with the edge device, the communications adapter should accommodate the data port's prescribed protocols and physical interface requirements. Devices using RFID tags (or similar technologies (e.g., NFC)) generally have no physical port, but an adapter should nevertheless accommodate the wireless interface and protocol. In other situations, custom data ports could be created. Some may need to be fully customized, while others could be based upon communication interface standards agreed upon by device manufacturers interested in making their device's operational information available to the system 10. Whatever the case, these devices all require a communications adapter to provide access to the system (e.g., to the management module via the communications network).

In this regard, the present invention also embraces a communications adapter for connecting a dumb device to a communications network. In an exemplary embodiment, the communication adapter is a device that is configured for enabling the transmission of operational information from a dumb device to a communications network.

Dumb devices without connectivity can be almost any machine, apparatus, or appliance that generates measurable data. Forklifts, thermostats, and cars are all examples of these types of devices. In the past, the operational information generated by these devices has either been ignored or used only in limited ways. The communication adapter allows access to this operational information to allow for more general use in a wider variety of ways beyond the strict confines of the dumb device's own domain. The communication adapter must communicate with the protocol of the dumb device and physically interface with either existing data I/O ports or I/O ports customized for enabling interfacing with the communication adapter. Consequently, a communication adapter suitable for use with one type of dumb device will typically not conform to the same specifications as a communication adapter for another type of dumb device. In other words, each type of dumb device may be required to have a uniquely configured communication adapter. In general, however, the basic structure of a communication adapter may be described as follows.

Figure 13:
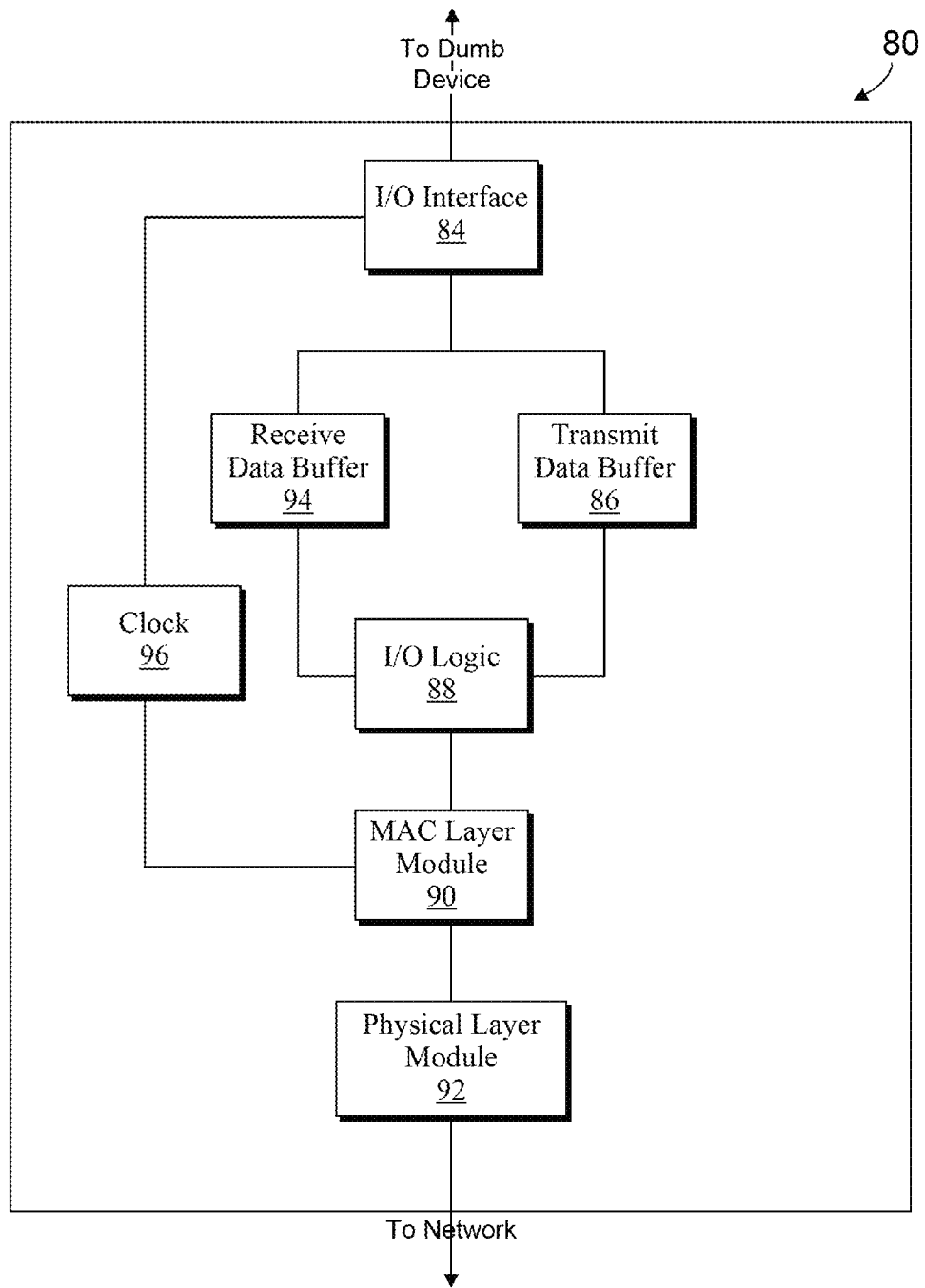
FIG. 13 depicts a block diagram of an exemplary communication adapter according to the present invention.

Reference is now made to FIG. 13. The communication adapter 80 can be connected (e.g., communicatively coupled) to a device with a supporting connector, a cable, or via wireless communications (e.g., RFID, Wi-Fi, etc.). The communication adapter 80 is typically of a physical size that easily integrates with the dumb device (not pictured). Dumb device operational information 40 can be passed to and from the dumb device via an input-output interface 84 (e.g., I/O interface). The I/O interface (i) communicatively connects with the dumb-device (e.g., electrical connection, radio connection, etc.); (ii) accommodates a variety of forms of operational information (e.g., analog, digital, and/or wireless); (iii) transmits and receive data traffic; and (iv) undoes any modulation or coding schemes imparted on the incoming operational information. The I/O interface 84 may convert the raw operational information generated by the dumb device into a data stream that is suitable for communication with the management module 11. The operational information is clocked into a transmit data buffer 86 where it is stored until it is ready to be retransmitted. A receive data buffer 94 may be included to store incoming data (e.g., data received from the management module 11) until it is ready to be transmitted to the dumb device 82. The I/O logic 88 is a processor that handles the routing and traffic control of the incoming and outgoing operational information. The I/O logic 88 also converts data into and out of packets. The media access control (MAC) layer module 90 provides address information to the packets and controls the message timing in coordination with an onboard clock 96. The physical layer module 92 provides the electrical, mechanical, and procedural interface to the transmission medium associated with the management module 11. The physical layer module 92 also communicates the data to the receiving entity which may be an intermediate device 15, or it may send it directly to the communications network 12. This communication can be wired or wireless and can be sent via a variety of different protocols (e.g., Bluetooth, 802.11, CDMA). Where the communication adapter 80 transmits the operational information to an intermediate device 15, the intermediate device may translate the operational information using its installed data conversion module 46 before introducing it into the communications network 12.

In another aspect, the present invention embraces a method for storing operational information on a computer-readable storage medium. As mentioned, the databank 29 typically stores operational information transmitted to the management module 11 by the various edge devices 14A that are connected via the communications network 12. Furthermore, due to the improved scalability afforded by the systems and methods described herein, it is possible for there to be a very large number of edge devices 14A in communication with the management module 11. With a very large number of edge devices 14A each, individually, transmitting large amounts of operational information 40, the databank 29 is called upon to store extremely vast amounts of data.

The databank 29 typically is required to store and retrieve complex and disparate data as efficiently as possible. To enable this functionality, the databank 29 typically adopts a hierarchical data organization scheme for the storage of data. As will be appreciated by a person of ordinary skill in the art, a hierarchical database model is a data model in which data is organized using parent-child relationships to form a tree-like structure among a collection of nodes (e.g., records, elements). The pattern of organizing the data follows a one-to-many relationship where each parent node may have many child nodes, but each child nodes only has one parent. The originating node (e.g., the node that is a child of no other node) is known as the root node. An internal node (i.e., inner node or branch node) is any node that has child nodes. Those nodes that have no children are leaf nodes (i.e., outer node, terminal node). A subtree of tree T is a tree consisting of a node in T and all of its descendants in T.

According to the present invention, the hierarchical data contained in the databank 29 is updated using a merge tree storage and retrieval solution. In an exemplary embodiment, the databank 29 houses data within one or more XML documents. As will be appreciated by one of ordinary skill in the art, an XML document embodies a hierarchical data organization scheme. Using the method according to the present invention, data is added to the databank's XML document using a merge tree approach. The merge tree approach allows for large amounts of data to be stored very efficiently because it avoids redundant data storage without compromising the fidelity of the stored data. This merge tree approach is feasible because an XML document is an ordered, labeled tree. Each node of the tree corresponds to an XML element within the XML document. The leaf nodes correspond to leaf elements, which are elements that have no other elements nested within them. Leaf elements have an associated content (e.g., value).

Figure 14:
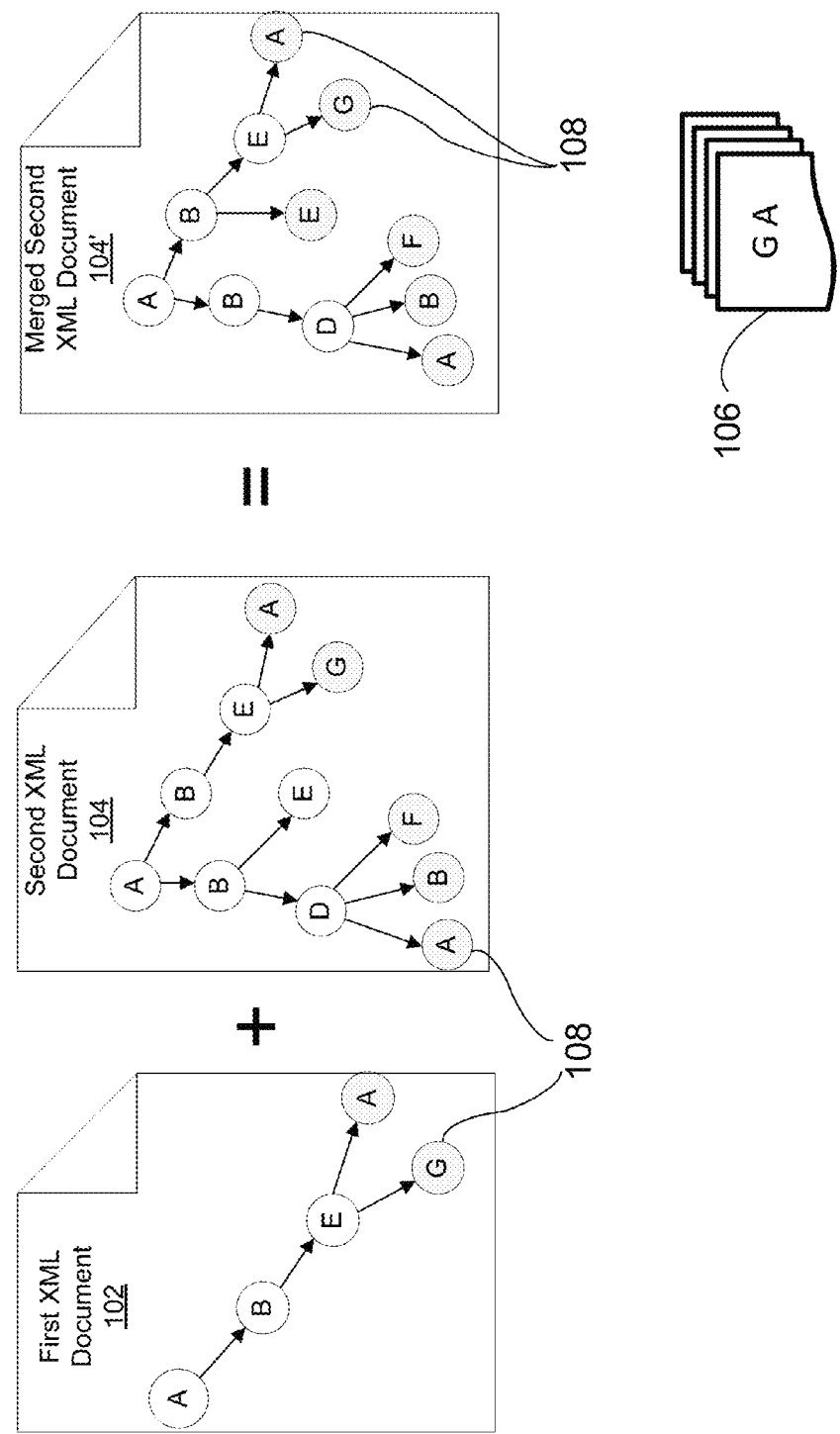
FIG. 14 depicts a block diagram of a merge tree approach involving a perfect merge of data into the databank of the system according to the present invention.

Referring now to FIG. 14, separate XML documents are represented by individual tree structures. The method 100 for storing a first XML document 102 to a databank having a second XML document 104 includes storing in the databank 29 a leaf-element-association 106 between the first XML document 102 and the leaf elements 108 (e.g., leaf nodes, terminal nodes) of the second XML document 104 that are included in any subtree matching the tree structure of the first XML document 102. The second XML document 104 therefore represents a merge tree (e.g., merge tree database) which serves as a central repository for all warehoused data, and to which references are created to represent the smaller XML documents (e.g., first XML document) that have been aggregated together to form the second XML document 104.

As the databank 29 grows, new XML documents are considered by their representative elements before they are added. XML is a hierarchy of data having strict formatting rules making it possible to compare each new XML document with the existing hierarchy of data. When a first XML document 102 is to be written to the databank 29 (e.g., XML database) and the data structure of the first XML document 102 is already represented in the hierarchy of data, then no new entries to the databank 29 are necessary. Under this "perfect merge" scenario, only the leaf elements 108 of the first XML document 102 must be stored to remember what constitutes the first XML document 102 that was merged into the second XML document 104. Typically, the leaf elements 108 are stored in a leaf-element-association 106, which is typically a file containing a listing of leaf element collections representing separate XML documents.

Figure 15:
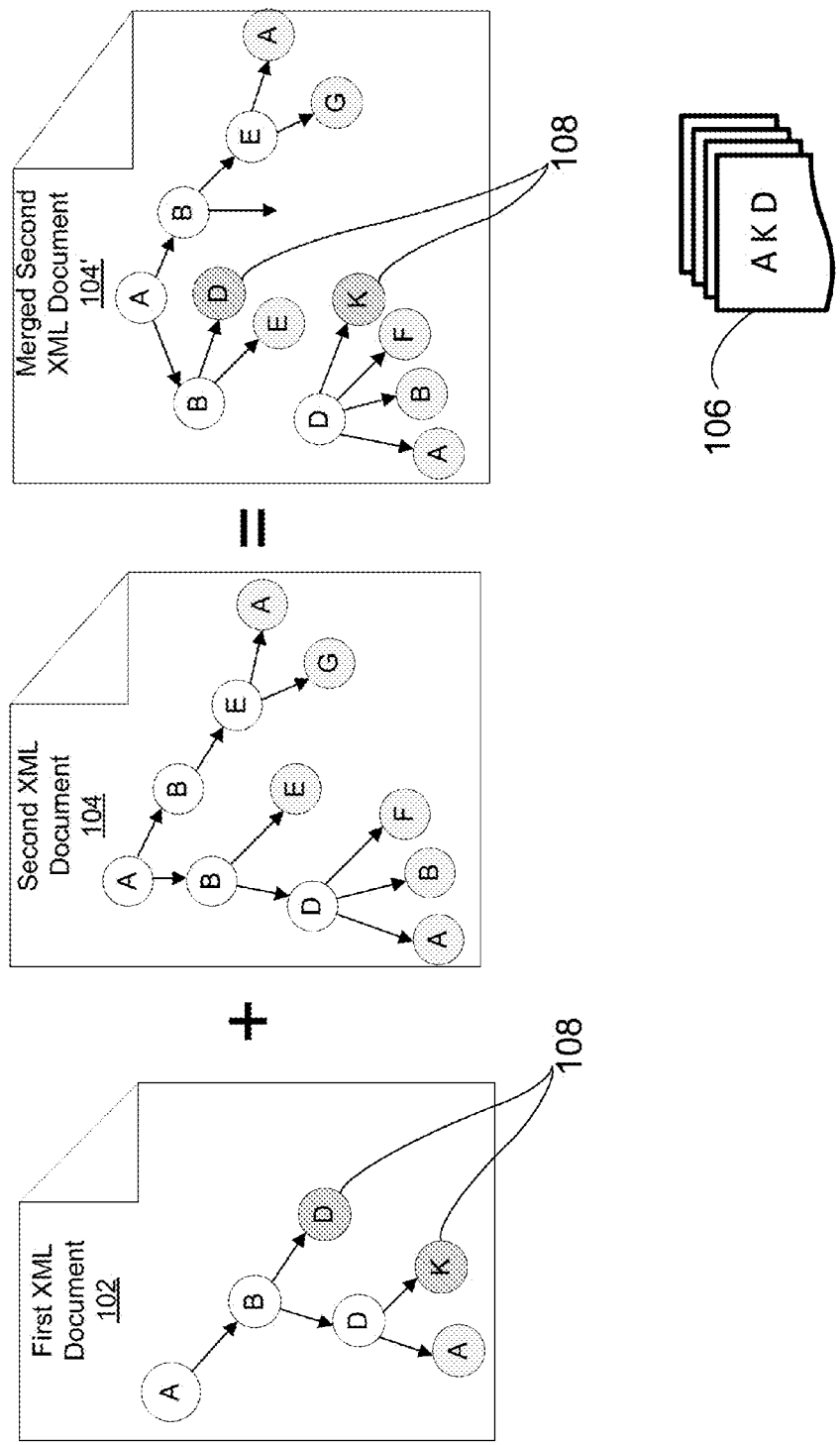
FIG. 15 depicts a block diagram of a merge tree approach involving an imperfect merge of data into the databank of the system according to the present invention.

Alternatively, as shown in FIG. 15, when a first XML document 102 that is to be written to the databank 29 is not fully represented in the second XML document 104, an imperfect merge scenario arises. In an imperfect merge, only the leaf elements 108 that are missing from an otherwise matching subtree of the second XML document 104 must be added to the second XML document 104 to allow representation of the first XML document 102 by reference to the leaf elements 108 of the second XML document's matching, amended subtree. As with the perfect merge, the leaf elements 108 of the matching, amended subtree are recorded in association with the first XML document 102 in a leaf-element-association 106.

The single merged database along with the terminal node information stored for each constituent XML document makes the query and retrieval of data easy. Data can be queried in number of different ways to obtain XML documents, infosets of XML data, pieces of XML data, or just information about the XML data itself.

A query to find all XML documents with a specific Xpath can be executed. Xpath is XML syntax for defining parts of an XML document, or in other words, it is an expression that selects elements, or a node-set, in an XML document. Thus a query for all XML documents that have a particular Xpath would be identified in a tree formed by combining a search for that Xpath in the merged tree and identifying the XML documents that have leaf elements 108 associated with the Xpath.

A similar technique can be used to query specific infosets or pieces of XML data. For example, a query for just a portion of the stored XML rather than a query for each whole XML document will generate an infoset. Pieces of XML data that are the result of querying the merged hierarchy can be queried at a particular part to find the multiple XML documents stored there. Even information about the XML documents stored in the merge tree may be obtained. For example it is easy to determine how many XML documents use a particular Xpath.

The merge tree approach to storage of large amounts of data supports large node content by using industry NoSQL techniques. Hierarchical records may contain nodes that have content greater than a threshold or may represent content through the W3C XOP standard. In both cases, if the content in a single node is representative of large or opaque content then it is possible to store that content in the merge tree as a link or key to the actual content stored in a NoSQL storage solution. This allows for a traditional NoSQL query across huge sets of disparate flat records and maintains a link back to the location in the merge tree. For instance, any large NoSQL query that results in a number of records having links in the merge tree can be combined with information about the XML stored in the merge tree related to that particular group of large records.

The merge tree database can work independently, but can also work in a distributed model. Multiple merge trees can exist separately by coordinating which XML schemas are sent/received to each merge tree. This can be accomplished by placing conditions on the XML schemas. Alternatively multiple merge trees can exist through topology changes where the XML is physically distributed through connectivity.

The distributed model supports distributed storage and retrieval for performance. Results from a single query can span multiple merge trees and can be combined. Merge trees can also be combined and separated based on Xpath rules. For example a query of all XML records inside a single merge tree can be returned as a merge tree result, or in other words, the merge tree union along with all terminal nodes representing each identified XML document. In this case mere tree results can be moved/shared as a whole more efficiently than by sending all XML documents separately.

To provide the above-described functionality, the management module 11 typically employs a meta language that is capable of describing the topology of the various system devices and that is capable of communicating raw information (e.g., operational information) that can come from any number of known or unknown devices (e.g., edge devices).

An exemplary meta language that can be employed by the management module is the Remote Markup Language (RML). RML is a data markup syntax that uses existing industry standards (e.g., XML, XOP, XSD, and XSLT). In contrast with existing industry standards, RML provides a standard that is neither too loose nor too strict and, thus, provides sufficient specificity but is not too prescriptive. RML defines rules regarding how to use these industry standards in order to express context (e.g., origin, destination, subject, and boundary), constructs (e.g., verbs, nouns, groups, and attributes), translations, data formats, and documentation in a common way.

To facilitate communication with various types of devices, RML allows for the creation of one or more semantic groupings. Each semantic grouping includes various types of raw information (e.g., operational information) that can come from system devices and a common semantic meaning for that raw information. The semantic groupings are used to translate raw information from system devices into an intermediary data result. This intermediary data result may then be translated (e.g., using XSLT) into a desired logical and/or a graphical output. The semantic groupings (e.g., group definitions) can be changed to include new types of raw information (e.g., from a new type of device) without affecting the raw information flowing from various devices.

For example, it may be desirable to define a semantic grouping for the exterior color of a scanning device being black. A type I scanner may produce the output "external color=charcoal." A type II scanner may produce the output "outside color=slate." Each of these two device outputs may then be translated using the semantic grouping to create the intermediate result "exterior color=black." This intermediate result may then be translated to display this information about each scanner in the physical view and/or in a user-defined view on the visual display.

The present system for managing scanner devices typically generates a significant amount of statistical data. Accordingly, RML facilitates the creation of changeable aggregation rules for transforming and/or storing statistical data. These aggregation rules may be used to filter statistical data at each device within the system that receives and stores statistical data.

RML may also facilitate the support of large unparsed data blocks. In this regard, RML supports the use of the XOP standard and therefore allows the use of XOP references within RML messages.

In this regard, the present invention embraces a method for representing operational information generated by an edge device. The method includes writing the operational information to a computer-readable file using a markup language. Typically, the markup language is XML and the computer-readable file is an XML file. Typically, the operational information is represented in the computer-readable file (e.g., XML document) using the following constructs: (i) name/value pairs, (ii) context, (iii) verbs, and (iv) nouns, as each of these constructs are defined herein.

Each discrete representation of operational will include a name/value pair that includes a name element and a value element. As will be understood by a person of ordinary skill in the art, the term "element" in the context of a markup language (e.g., XML) refers to the basic unit of the markup document (e.g., XML document). The element may contain attributes, other elements, text, and other building blocks for a markup language document. A name element may be any string identifier used to represent the operational information. The value element can be any data type including an XOP unparsed data block.

The context portion includes an origin element, a destination element, and a boundary element. The origin element identifies the source of the operational information (e.g., the edge device that generated the operational information). The destination element identifies the system component (e.g., a second edge device, a plug-in application, etc.) to which the file containing the operational information should be directed. The boundary element provides user-defined context (e.g., time of transmission).

The verb portion includes a command element and a notifications element. The command element contains actions that are expected to be performed by the recipient of the computer-readable file. For example, a command element can request the return of specified information from the recipient. The notifications element contains informative dialog intending to give the file recipient an indication of the reason for the transmission of the file to the recipient.

The noun element represents atomic data bits. The noun element incorporates at least one name element (as a child element) and at least one associated value element (as a child element).

As will be appreciated by a person of ordinary skill in the art, the present invention may be embodied as a method, system, or computer program product. Accordingly, the present invention may take the form of an entirely hardware embodiment, an entirely software embodiment (including firmware), or an embodiment combining software and hardware aspects. The present invention may take the form of a computer program product on a computer-readable storage medium having computer-readable program code embodied in the computer-usable storage medium. The computer-readable program code may be loaded onto a computer or other programmable data processing apparatus for the purpose of causing a series of operational steps to be performed by the computer to produce a computer-implemented process for implementing the functions or acts specified in this disclosure.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

To supplement the present disclosure, this application incorporates entirely by reference the following patents, patent application publications, and patent applications: U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,819; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,559,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,593,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; International Publication No. 2013/163789; International Publication No. 2013/173985; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0225757; U.S. Patent Application Publication No. 2011/0169999; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193407; U.S. Patent Application Publication No. 2012/0193423; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0056285; U.S. Patent Application Publication No. 2013/0068840; U.S. Patent Application Publication No. 2013/0070322; U.S. Patent Application Publication No. 2013/0075168; U.S. Patent Application Publication No. 2013/0082104; U.S. Patent Application Publication No. 2013/0175341 U.S. Patent Application Publication No. 2013/0175343; U.S. Patent Application Publication No. 2013/0200158; U.S. Patent Application Publication No. 2013/0256418; U.S. Patent Application Publication No. 2013/0257744; U.S. Patent Application Publication No. 2013/0257759; U.S. Patent Application Publication No. 2013/0270346; U.S. Patent Application Publication No. 2013/0278425; U.S. Patent Application Publication No. 2013/0287258; U.S. Patent Application Publication No. 2013/0292474; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306730; U.S. Patent Application Publication No. 2013/0306731; U.S. Patent Application Publication No. 2013/0306734; U.S. Patent Application Publication No. 2013/0307964; U.S. Patent Application Publication No. 2013/0313324; U.S. Patent Application Publication No. 2013/0313325; U.S. Patent Application Publication No. 2013/0313326; U.S. Patent Application Publication No. 2013/0327834; U.S. Patent Application Publication No. 2013/0341399; U.S. Patent Application Publication No. 2013/0342717; U.S. Patent Application Publication No. 2014/0001267; U.S. Patent Application Publication No. 2014/0002828; U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/736,139 for an Electronic Device Enclosure, filed Jan. 8, 2013 (Chaney); U.S. patent application Ser. No. 13/750,304 for Measuring Object Dimensions Using Mobile Computer, filed Jan. 25, 2013; U.S. patent application Ser. No. 13/771,508 for an Optical Redirection Adapter, filed Feb. 20, 2013 (Anderson); U.S. patent application Ser. No. 13/780,158 for a Distraction Avoidance System, filed Feb. 28, 2013 (Sauerwein); U.S. patent application Ser. No. 13/780,196 for Android Bound Service Camera Initialization, filed Feb. 28, 2013 (Todeschini et al.); U.S. patent application Ser. No. 13/780,271 for a Vehicle Computer System with Transparent Display, filed Feb. 28, 2013 (Fitch et al.); U.S. patent application Ser. No. 13/780,356 for a Mobile Device Having Object-Identification Interface, filed Feb. 28, 2013 (Samek et al.); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/792,322 for a Replaceable Connector, filed Mar. 11, 2013 (Skvoretz); U.S. patent application Ser. No. 13/852,097 for a System and Method for Capturing and Preserving Vehicle Event Data, filed Mar. 28, 2013 (Barker et al.); U.S. patent application Ser. No. 13/885,218 for a Indicia Encoding System with Integrated Purchase and Payment Information, filed Oct. 6, 2013 (Liu et al.); U.S. patent application Ser. No. 13/895,846 for a Method of Programming a Symbol Reading System, filed Apr. 10, 2013 (Corcoran); U.S. patent application Ser. No. 13/902,110 for a System and Method for Display of Information Using a Vehicle-Mount Computer, filed May 24, 2013 (Hollifield); U.S. patent application Ser. No. 13/902,144, for a System and Method for Display of Information Using a Vehicle-Mount Computer, filed May 24, 2013 (Chamberlin); U.S. patent application Ser. No. 13/902,242 for a System For Providing A Continuous Communication Link With A Symbol Reading Device, filed May 24, 2013 (Smith et al.); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); U.S. patent application Ser. No. 14/019,616 for a Device Having Light Source to Reduce Surface Pathogens, filed Sep. 6, 2013 (Todeschini); U.S. patent application Ser. No. 14/023,762 for a Handheld Indicia Reader Having Locking Endcap, filed Sep. 11, 2013 (Gannon); and U.S. patent application Ser. No. 14/035,474 for Augmented-Reality Signature Capture, filed Sep. 24, 2013 (Todeschini); U.S. patent application Ser. No. 14/047,896 for Terminal Having Illumination and Exposure Control filed Oct. 7, 2013 (Jovanovski et al.)U.S. patent application Ser. No. 14/058,721 for a Terminal Configurable for Use Within an Unknown Regulatory Domain, filed Oct. 21, 2013 (Pease et al.); U.S. patent application Ser. No. 14/035,474 for Augmented-Reality Signature Capture, filed Sep. 24, 2013 (Todeschini); U.S. patent application Ser. No. 14/050,515 for Hybrid-Type Bioptical, filed Oct. 10, 2013 (Edmonds et al.); U.S. patent application Ser. No. 14/053,175 for Imaging Apparatus Having Imaging Assembly, filed Oct. 14, 2013 (Barber et. al.); U.S. patent application Ser. No. 14/055,234 for Dimensioning System, filed Oct. 16, 2013 (Fletcher); U.S. patent application Ser. No. 14/055,353 for Dimensioning System, filed Oct. 16, 2013 (Giordano et al.); U.S. patent application Ser. No. 14/055,383 for Dimensioning System, filed Oct. 16, 2013 (Li et al.); U.S. patent application Ser. No. 14/050,675 for Apparatus for Displaying Bar Codes from Light Emitting Display Surfaces, filed Oct. 10, 2013 (Horn et al.); U.S. patent application Ser. No. 14/053,314 for Indicia Reader, filed Oct. 14, 2013 (Huck); U.S. patent application Ser. No. 14/058,762 for Terminal Including Imaging Assembly, filed Oct. 21, 2013 (Gomez et al.); U.S. patent application Ser. No. 14/058,831 for System Operative to Adaptively Select an Image Sensor for Decodable Indicia Reading, filed Oct. 21, 2013 (Sauerwein); U.S. patent application Ser. No. 14/062,239 for Chip on Board Based Highly Integrated Imager, filed Oct. 24, 2013 (Toa et al.); U.S. patent application Ser. No. 14/065,768 for Hybrid System and Method for Reading Indicia, filed Oct. 29, 2013 (Meier et al.); U.S. patent application Ser. No. 14/074,746 for Self-Checkout Shopping System, filed Nov. 8, 2013 (Hejl et al.); U.S. patent application Ser. No. 14/074,787 for Method and System for Configuring Mobile Devices via NFC Technology, filed Nov. 8, 2013 (Smith et al.); U.S. patent application Ser. No. 14/082,379 for Method and Apparatus for Compensating Pixel Values in an Imaging, filed Nov. 18, 2013 (Hussey et al.); U.S. patent application Ser. No. 14/082,468 for Encoded Information Reading Terminal with Wireless Path Selection Capability, filed Nov. 18, 2013 (Wang et al.); U.S. patent application Ser. No. 14/082,551 for Power Management Scheme for Portable Data Collection Devices Utilizing Location and Position Sensors, filed Nov. 18, 2013 (Sauerwein et al.); U.S. patent application Ser. No. 14/087,007 for Scanner with Wake-Up Mode, filed Nov. 22, 2013 (Nahill et al.); U.S. patent application Ser. No. 14/087,190 for Optimal Range Indicators for Bar Code Validation, filed Nov. 22, 2013 (Hejl); U.S. patent application Ser. No. 14/093,484 for System for Capturing a Document in an Image Signal, filed Dec. 1, 2013 (Showering); U.S. patent application Ser. No. 14/093,487 for Method and System Operative to Process Color Image Data, filed Dec. 1, 2013 (Li et al.); U.S. patent application Ser. No. 14/093,490 for Imaging Terminal Having Image Sensor and Lens Assembly, filed Dec. 1, 2013 (Havens et al.); U.S. patent application Ser. No. 14/093,624 for Apparatus Operative for Capture of Image Data, filed Dec. 2, 2013 (Havens et al.); U.S. patent application Ser. No. 14/094,087 for Method and System for Communicating Information in an Digital Signal, filed Dec. 2, 2013 (Peake et al.); U.S. patent application Ser. No. 14/101,965 for High Dynamic-Range Indicia Reading System, filed Dec. 10, 2013 (Xian); U.S. patent application Ser. No. 14/107,048 for Roaming Encoded Information Reading Terminal, filed Dec. 16, 2013 (Wang et al.); U.S. patent application Ser. No. 14/118,400 for Indicia Decoding Device with Security Lock, filed Nov. 18, 2013 (Liu);U.S. patent application Ser. No. 14/138,206 for System and Method to Store and Retrieve Identifier Associated Information, filed Dec. 23, 2013 (Gomez et al.); U.S. patent application Ser. No. 14/143,399 for Device Management Using Virtual Interfaces, filed Dec. 30, 2013 (Caballero).

The invention claimed is:

1. A system for managing scanner devices, comprising:
a management module having a processor and memory, the management module being communicatively coupled to (i) to a user interface that includes a visual display, (ii) to a plurality of intermediate devices, and (iii) to a plurality of scanner devices, at least one of the scanner devices being communicatively coupled to one of the intermediate devices;
wherein the memory includes programming to control the processor for:
displaying with the visual display a physical view of the connections between the management module, the intermediate devices, and the scanner devices, the physical view including (i) a plurality of icons, each icon representing one of the management module, intermediate devices, or scanner devices, and (ii) a plurality of markers, the markers representing the connections between the management module, the intermediate devices, and the scanner devices, wherein the physical view has a hub and spoke architecture;
displaying with the visual display a first user-defined view of the management module, the intermediate devices, and the scanner devices, the first user-defined view including a plurality of icons, each icon representing one of the management module, intermediate devices, or scanner devices, wherein for each icon representing a surrogate device the first user-defined view includes an icon for each intermediate device or scanner device dependent on the surrogate device and one or more markers representing the connections therebetween;
creating a folder in the first user-defined view in response to a command received from the user interface;
moving a folder in the first user-defined view in response to a command received from the user interface; and
receiving a command from the user interface to move an icon representing one of the intermediate devices or scanner devices within the first user-defined view, and, thereafter, (i) maintaining the position of the icon if the intermediate device or scanner device represented by the icon is dependent on a surrogate device or (ii) moving the icon in accordance with the command from the user interface if the intermediate device or scanner device represented by the icon is not dependent on a surrogate device, wherein, if the icon represents a surrogate device, moving the icon includes moving an icon for each intermediate device or scanner device dependent on the surrogate device and one or more markers representing the connections therebetween.

2. The system for managing scanner devices according to claim 1, wherein the memory includes programming to control the processor for:
detecting a change in the connections between the management module, the intermediate devices, and the scanner devices;
updating the physical view to reflect the change in the connections between the management module, the intermediate devices, and the scanner devices; and
updating the first user-defined view to reflect the change in the connection between a surrogate device and a dependent device.

3. The system for managing scanner devices according to claim 2, wherein:
detecting a change in the connections between the management module, the intermediate devices, and the scanner devices comprises detecting whether a scanner device or an intermediate device becomes disconnected from the management module; and
the memory includes programming to control the processor for altering in the physical view and the first-user defined view each icon representing the disconnected scanner device or intermediate device and/or each marker representing a connection to the disconnected scanner device or intermediate device to thereby reflect (i) that the disconnected scanner device or intermediate device is disconnected and (ii) how the disconnected scanner device or intermediate device was previously connected.

4. The system for managing scanner devices according to claim 2, wherein:
detecting a change in the connections between the management module, the intermediate devices, and the scanner devices comprises detecting a new scanner device or intermediate device that is communicatively coupled to the management module; and
the memory includes programming to control the processor for updating the physical view and the first user-defined view to reflect the new scanner device or intermediate device.

5. The system for managing scanner devices according to claim 1, wherein the memory includes programming to control the processor for displaying a second user-defined view, the second user-defined view including a plurality of icons, each icon representing one of the management module, intermediate devices, or scanner devices.

6. The system for managing scanner devices according to claim 1, wherein the memory includes programming to control the processor for:
displaying with the visual display an icon representing a scanner configuration file;
receiving a command from the user interface to drag the icon representing the scanner configuration file onto an icon representing a scanner device; and
configuring the scanner device in accordance with the scanner configuration file.

7. The system for managing scanner devices according to claim 1, wherein the memory includes programming to control the processor for:
displaying with the visual display an icon representing a scanner configuration file;
receiving a command from the user interface to drag the icon representing the scanner configuration file onto an icon representing a surrogate device; and configuring the surrogate device and each scanner device dependent on the surrogate device in accordance with the scanner configuration file.

8. The system for managing scanner devices according to claim 1, wherein the memory includes programming to control the processor for:
receiving a context-sensitive input from the user interface to select an icon representing a scanner device;
displaying with the visual display a menu having an option to acquire the configuration of the selected scanner device;
receiving a command from the user interface to acquire the configuration of the selected scanner device; and
acquiring the configuration of the selected scanner device.

9. A system for managing edge devices, comprising:
a management module having a processor and a memory, the management module being communicatively coupled (i) to a user interface that includes a visual display, (ii) to a plurality of intermediate devices, and (iii) to a plurality of edge devices, at least one of the edge devices being communicatively coupled to one of the intermediate devices;
wherein the memory includes programming to control the processor for:
displaying with the visual display a physical view of the connections between the management module, the intermediate devices, and the edge devices, the physical view including (i) a plurality of icons, each icon representing one of the management module, intermediate devices, or edge devices, and (ii) a plurality of markers, the markers representing the connections between the management module, the intermediate devices, and the edge devices, wherein the physical view has a hub and spoke architecture;
displaying with the visual display a first user-defined view of the management module, the intermediate devices, and the edge devices, the first user-defined view including a plurality of icons, each icon representing one of the management module, intermediate devices, or edge devices, wherein for each icon representing a surrogate device the first user-defined view includes an icon for each intermediate device or edge device dependent on the surrogate device and one or more markers representing the connections therebetween;
creating a folder in the first user-defined view in response to a command received from the user interface;
moving a folder in the first user-defined view in response to a command received from the user interface; and
receiving a command from the user interface to move an icon representing one of the intermediate devices or edge devices within the first user-defined view, and, thereafter, (i) maintaining the position of the icon if the intermediate device or edge device represented by the icon is dependent on a surrogate device or (ii) moving the icon in accordance with the command from the user interface if the intermediate device or edge device represented by the icon is not dependent on a surrogate device, wherein, if the icon represents a surrogate device, moving the icon includes moving an icon for each intermediate device or edge device dependent on the surrogate device and one or more markers representing the connections therebetween.

10. The system for managing edge devices according to claim 9, wherein the memory includes programming to control the processor for:
detecting a change in the connections between the management module, the intermediate devices, and the edge devices;
updating the physical view to reflect the change in the connections between the management module, the intermediate devices, and the edge devices; and
updating the first user-defined view to reflect the change in the connection between a surrogate device and a dependent device.

11. The system for managing edge devices according to claim 10, wherein:
detecting a change in the connections between the management module, the intermediate devices, and the edge devices comprises detecting whether a edge device or an intermediate device becomes disconnected from the management module; and
wherein the memory includes programming to control the processor for altering in the physical view and the first-user defined view each icon representing the disconnected edge device or intermediate device and/or each marker representing a connection to the disconnected edge device or intermediate device to thereby reflect (i) that the disconnected edge device or intermediate device is disconnected and (ii) how the disconnected edge device or intermediate device was previously connected.

12. The system for managing edge devices according to claim 10, wherein:
detecting a change in the connections between the management module, the intermediate devices, and the edge devices comprises detecting a new edge device or intermediate device that is communicatively coupled to the management module; and
wherein the memory includes programming to control the processor for updating the physical view and the first user-defined view to reflect the new edge device or intermediate device.

13. The system for managing edge devices according to claim 9, wherein the memory includes programming to control the processor for displaying a second user-defined view, the first user-defined view including a plurality of icons, each icon representing one of the management module, intermediate devices, or edge devices.

14. The system for managing edge devices according to claim 9, wherein the memory includes programming to control the processor for:
displaying with the visual display an icon representing a edge device configuration file;
receiving a command from the user interface to drag the icon representing the edge device configuration file onto an icon representing a edge device; and
configuring the edge device in accordance with the edge device configuration file.

15. The system for managing edge devices according to claim 9, wherein the memory includes programming to control the processor for:
displaying with the visual display an icon representing a edge device configuration file;
receiving a command from the user interface to drag the icon representing the edge device configuration file onto an icon representing a surrogate device; and
configuring the surrogate device and each edge device dependent on the surrogate device in accordance with the edge device configuration file.

16. The system for managing edge devices according to claim 9, wherein the memory includes programming to control the processor for:
 receiving a context-sensitive input from the user interface to select an icon representing a edge device;
 displaying with the visual display a menu having an option to acquire the configuration of the selected edge device;
 receiving a command from the user interface to acquire the configuration of the selected edge device; and
 acquiring the configuration of the selected edge device.

17. A computer-readable medium comprising computer-executable instructions embodied in a non-transitory computer-readable medium and when executed by a processor of a computer performs the steps comprising:
 displaying with a visual display a physical view of the connections between a management module, a plurality of intermediate devices, and a plurality of edge devices, the physical view including (i) a plurality of icons, each icon representing one of the management module, intermediate devices, or edge devices, and (ii) a plurality of markers, the markers representing the connections between the management module, the intermediate devices, and the edge devices, wherein the physical view has a hub and spoke architecture;
 displaying with the visual display a first user-defined view of the management module, the intermediate devices, and the edge devices, the first user-defined view including a plurality of icons, each icon representing one of the management module, intermediate devices, or edge devices, wherein for each icon representing a surrogate device the first user-defined view includes an icon for each intermediate device or edge device dependent on the surrogate device and one or more markers representing the connections therebetween;
 creating a folder in the first user-defined view in response to a command received from the user interface;
 moving a folder in the first user-defined view in response to a command received from the user interface; and
 receiving a command from the user interface to move an icon representing one of the intermediate devices or edge devices within the first user-defined view, and, thereafter, (i) maintaining the position of the icon if the intermediate device or scanner device represented by the icon is dependent on a surrogate device or (ii) moving the icon in accordance with the command from the user interface if the intermediate device or edge device represented by the icon is not dependent on a surrogate device, wherein, if the icon represents a surrogate device, moving the icon includes moving an icon for each intermediate device or edge device dependent on the surrogate device and one or more markers representing the connections therebetween.

18. The computer-readable medium of claim 17 that performs steps comprising:
 detecting a change in the connections between the management module, the intermediate devices, and the edge devices;
 updating the physical view to reflect the change in the connections between the management module, the intermediate devices, and the edge devices; and
 updating the first user-defined view to reflect the change in the connection between a surrogate device and a dependent device.

19. The computer-readable medium of claim 18 that performs steps comprising:
 altering in the physical view and the first-user defined view each icon representing a disconnected edge device or intermediate device and/or each marker representing a connection to the disconnected edge device or intermediate device to thereby reflect (i) that the disconnected edge device or intermediate device is disconnected and (ii) how the disconnected edge device or intermediate device was previously connected.

20. The computer-readable medium of claim 18 that performs steps comprising:
 updating the physical view and the first user-defined view to reflect the detection of a new edge device or intermediate device that is communicatively coupled to the management module.

* * * * *